United States Patent
Syed et al.

(10) Patent No.: US 9,621,969 B2
(45) Date of Patent: Apr. 11, 2017

(54) MANAGEMENT AND CONTROL OF SOFTWARE DEFINED NETWORKING ENABLED OPEN TRANSPORT NETWORKS

(71) Applicant: Infinera Corp., Annapolis Junction, MD (US)

(72) Inventors: Sharfuddin Syed, San Jose, CA (US); Ping Pan, San Jose, CA (US); Abhinava Shivakumar Sadasivarao, Milpitas, CA (US); Chris Liou, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 384 days.

(21) Appl. No.: 14/145,756

(22) Filed: Dec. 31, 2013

(65) Prior Publication Data

US 2015/0131989 A1   May 14, 2015

Related U.S. Application Data

(60) Provisional application No. 61/902,631, filed on Nov. 11, 2013.

(51) Int. Cl.
| | |
|---|---|
| *H04B 10/00* | (2013.01) |
| *H04Q 11/00* | (2006.01) |
| *H04L 12/24* | (2006.01) |
| *H04J 14/00* | (2006.01) |

(52) U.S. Cl.
CPC ..... *H04Q 11/0066* (2013.01); *H04L 41/0803* (2013.01); *H04Q 2011/0016* (2013.01); *H04Q 2011/0073* (2013.01); *H04Q 2011/0077* (2013.01); *H04Q 2011/0086* (2013.01)

(58) Field of Classification Search
CPC ..... H04Q 2011/0073; H04Q 2011/0077; H04J 14/0267
USPC .......................................................... 398/57
See application file for complete search history.

(56) References Cited

U.S. PATENT DOCUMENTS

| | | | |
|---|---|---|---|
| 2003/0147645 A1* | 8/2003 | Imajuku ............. | H04Q 11/0005 398/7 |
| 2015/0063802 A1* | 3/2015 | Bahadur ............... | H04L 47/125 398/49 |

* cited by examiner

*Primary Examiner* — Daniel Dobson
(74) *Attorney, Agent, or Firm* — Dunlap Codding P.C.; David L. Soltz

(57) ABSTRACT

Apparatuses are disclosed including a node having a switch for communicating traffic from input interface to output interface; and a control module, located proximate to the input interface, output interface and switch, comprising a communication interface configured to connect to a third communication link external to the node and having a processor accessing network node configuration information and being configured to compute a path to a destination node through the output interface with the network node configuration information and also configured to be switched from a first state in which the processor provides first instructions to the switch to configure the switch to communicate the traffic from the input interface to the output interface, to a second state in which the processor provides second instructions, received via the communication interface, to the switch to configure the switch to communicate traffic from the input interface to the output interface.

12 Claims, 21 Drawing Sheets

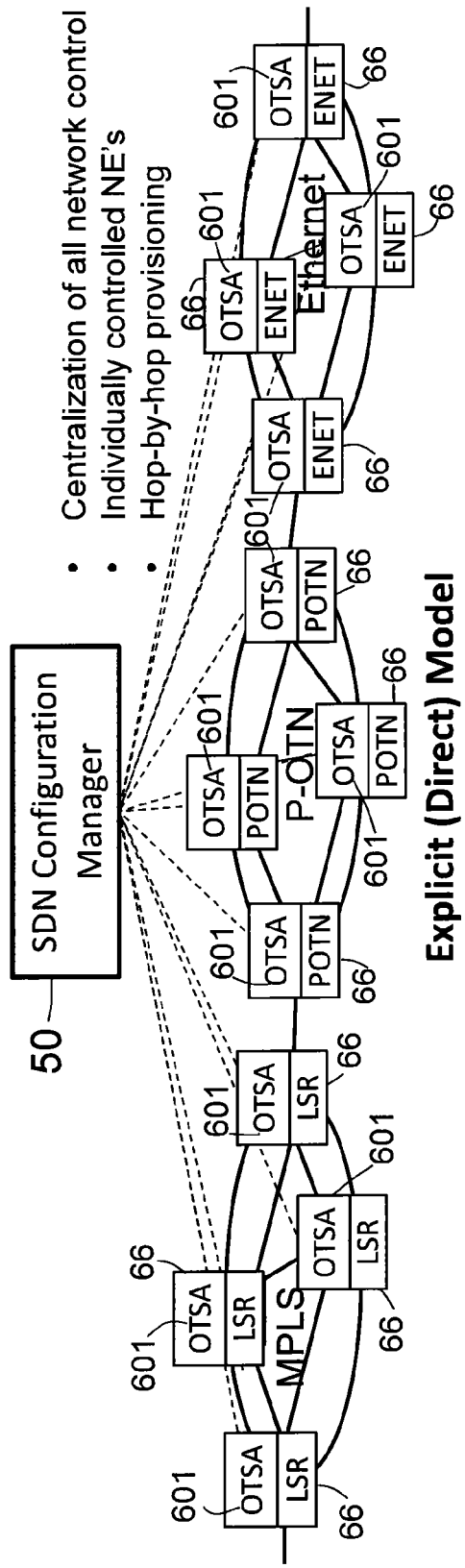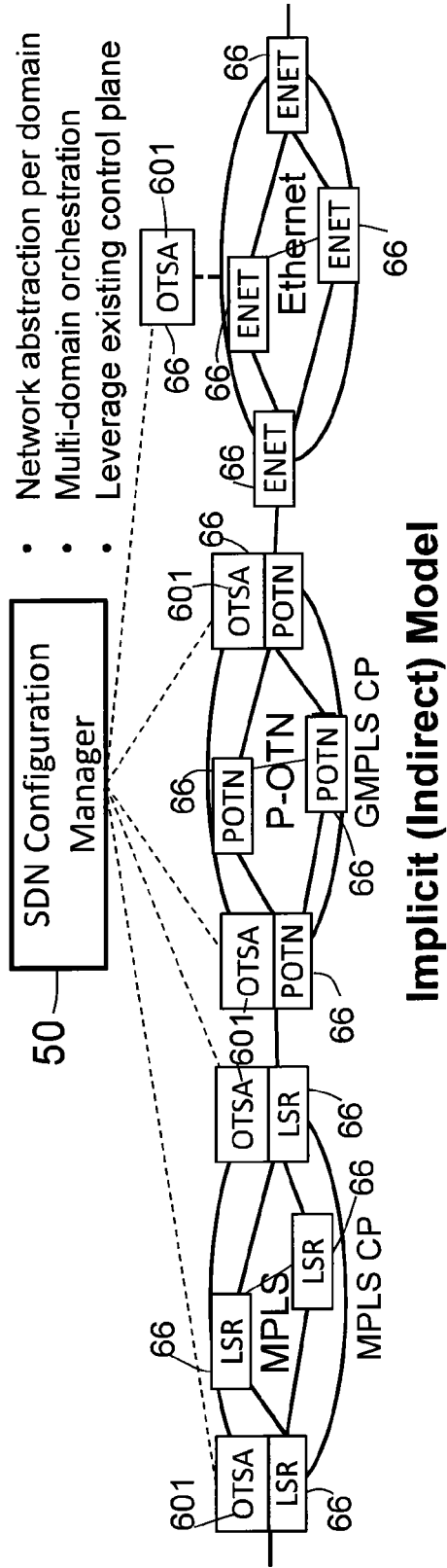

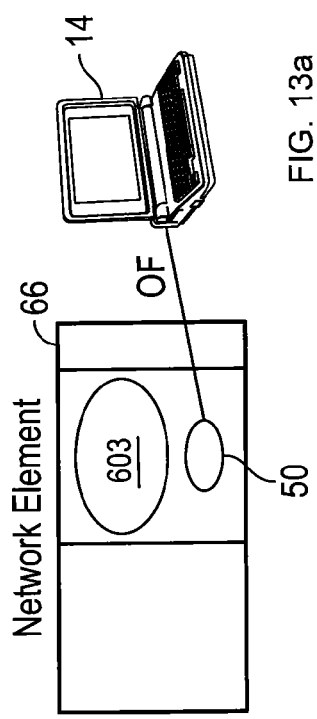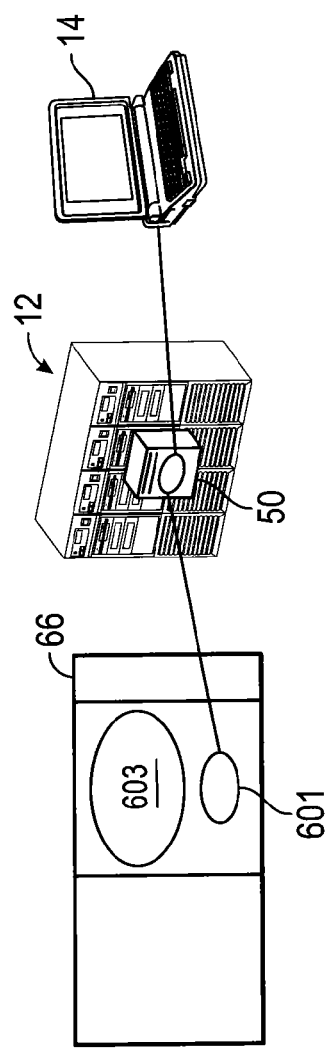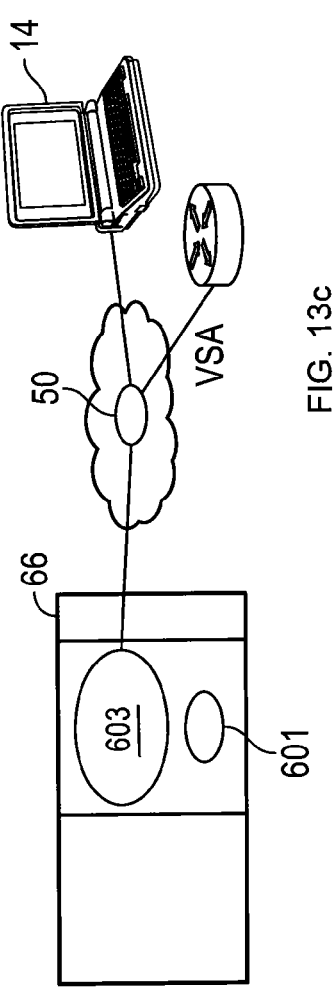
FIG. 13a
FIG. 13b
FIG. 13c

Physical Network

Virtual Network 1

Virtual Network 2

MANAGEMENT AND CONTROL OF SOFTWARE DEFINED NETWORKING ENABLED OPEN TRANSPORT NETWORKS

INCORPORATION BY REFERENCE

The present patent application claims priority to the provisional patent application identified by U.S. Ser. No. 61/902,631, filed on Nov. 11, 2013, the entire contents of which are hereby incorporated herein by reference.

FIELD OF THE DISCLOSURE

The disclosure generally relates to methods and apparatuses for orchestration of configuration in multiple layers in data transport networks. More particularly the disclosure relates to methodologies for software defined networking (SDN) enabled open transport switching applications.

BACKGROUND

Generally, data transport networks are defined as having multiple "layers" that combine to make a network. For example, one standard that describes a multi-layer model is the International Telecommunication Union recommendation ITU-T X.200 (07/94), entitled "Information technology—Open Systems Interconnection—Basic Reference Model: The basic model." The Open Systems Interconnection (OSI) Model contains the following seven layers: the Application Layer (layer 7), the Presentation Layer (layer 6), the Session Layer (layer 5), the Transport Layer (layer 4), the Network Layer (layer 3), the Data Link Layer (layer 2), and the Physical Layer (layer 1). The model may also include a Layer Zero containing transmission media.

An Optical Transport Network (OTN) is comprised of a plurality of switch nodes linked together to form a network. The OTN includes an electronic layer and an optical layer. The electronic layer and the optical layer each contain multiple sub-layers. The optical layer provides optical connections, also referred to as optical channels or lightpaths, to other layers, such as the electronic layer. The optical layer performs multiple functions, such as monitoring network performance, multiplexing wavelengths, and switching and routing wavelengths. In general, the OTN is a combination of the benefits of SONET/SDH technology and dense wavelength-division multiplexing (DWDM) technology (optics). OTN structure, architecture, and modeling are further described in the International Telecommunication Union recommendations, including ITU-T G.709, ITU-T G.872, and ITU-T G.805, which are well known in the art.

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management of the OTN. One prominent protocol is referred to in the art as Generalized Multiprotocol Label Switching (GMPLS).

Generalized Multiprotocol Label Switching (GMPLS) is a type of protocol which extends multiprotocol label switching (MPLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel. Wave-division multiplexing is a type of multiplexing in which two or more optical carrier signals are multiplexed onto a single optical fiber by using different wavelengths (that is, colors) of laser light.

Typically, packet switched network systems are interconnected using wavelengths from the optical transmission backbone (the transport layer) that may contain a mix of WDM (optical) transmission and/or OTN (Digital) switching technologies and/or packet switching technologies. Conventionally, traffic engineers may set or pre-engineer a path for a data traffic flow through the packet switched layer of the network, or the path may be computed using native routing protocols within the packet switched layer.

Traffic Engineering (TE) is a technology that is concerned with performance optimization of operational networks, such as OTNs. In general, Traffic Engineering includes a set of applications, mechanisms, tools, and scientific principles that allow for measuring, modeling, characterizing and control of user data traffic in order to achieve specific performance objectives.

A switched network usually includes multiple switch nodes (also referred to as "nodes") which are connected by communication links and arranged in a topology referred to in the art as a "mesh network". Within the mesh network, user traffic can be transported between any two locations using predefined connections specifying particular links and/or switch nodes for conveying the user traffic. Shared Mesh Protection (SMP) is a common protection and recovery mechanism in mesh networks, where multiple paths can share the same set of network resources (such as bandwidth or timeslots) for protection purposes. Mesh networks utilizing Shared Mesh Protection may be referred to as shared mesh networks.

As discussed above, the switch nodes in the mesh network are each provided with a control module. The control modules of the switch nodes function together to aid in the control and management of the mesh networks. The control modules can run a variety of protocols for conducting the control and management of the mesh networks. One prominent protocol is referred to in the art as "Generalized Multiprotocol Label Switching (GMPLS)".

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. The headend node or tailend node initially selects to receive data over the working connection (such as an optical channel data unit label switched path) and then, when a working connection fails, the headend node or tailend node selects a protecting connection for passing data within the mesh network. The set up and activation of the protecting connections may be referred to as restoration or protection. Protection mechanisms, where network resources act as a backup for working connections, have been in use for some time.

Routing and topology management protocols may also be used with GMPLS. Under OSPF protocols, typically each node in an Optical Transport Network maintains a database of the network topology and the current set of resources available, as well as the resources used to support traffic. In the event of any changes in the network, or simply periodically, the node floods the updated topology information to all the Optical Transport Network nodes which use the updated topology information to update their local databases. The nodes use their local database information to chart routes through the Optical Transport Network.

In current systems, to set up a connection in an Optical Transport Network, nodes in the Optical Transport Network exchange messages with other nodes in the Optical Transport Network using RSVP or RSVP-TE signaling protocols. Resources required for the connection are reserved and switches inside a node of the network are pre-configured to forward information from certain input ports to certain output ports. Information sent by signaling protocols are often in a type-length-value (TLV) format. The same protocols may also be used to take down connections in the Optical Transport Network when the connections are no longer needed.

In recent years, a new device known as an "OpenFlow Switch" and new protocol known as "OpenFlow" have been introduced. In a classical router or switch, the fast packet forwarding (data path) and the high level routing decisions (control path) occur on the same device. An OpenFlow Switch separates these two functions onto separate devices. The data path portion still resides on the router or switch, while high-level routing decisions are moved to a separate controller which is typically a standard server. An exemplary high-level routing decision includes the computation of a new path within the network, and notifying routers or switches of the new path. The OpenFlow Switch and Controller communicate via the OpenFlow protocol, which defines messages, such as packet-received, send-packet-out, modify-forwarding-table, and get-stats.

SUMMARY

A method and system are disclosed that provide additional flexibility in the deployment and management of the transport networks. In some embodiments, the transport network is provided with a plurality of nodes with at least some of the nodes having a control module having a first processor accessing a first database storing first network node configuration information and being configured to compute a first path to a destination node within the transport network through the output interface with the first network node configuration information. Once the first path is computed, then the first processor sends first signals, which can conform to RSVP or RSVP-TE signaling protocols, to other nodes on the first path so that the other nodes will be configured to be a part of the first path. The transport network is also provided with a SDN configuration manager that may be separate from the plurality of nodes. The SDN configuration manager has a second processor accessing a second database storing second network node configuration information and being configured to compute a second path from a headend node (that does not include the second processor) to a tailend node of the plurality of nodes, updating the second network configuration information with information indicative of the second path, and sending second signals to at least the headend node and the tailend node to provision the second path. The second signals may conform to the protocol of the first signals, or may utilize a different protocol such as a protocol referred to in the art as "OpenFlow."

Utilizing first and second processors with the first processor being a part of the headend node of the paths computed by the first processor within the transport network, and the second processor being separate from the headend node of at least some of the paths computed by the second processor within the transport network provides additional flexibility in the management, configuration, discovery, monitoring and provisioning of the transport network.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 10A is a block diagram of an exemplary explicit provisioning model in accordance with the present disclosure.

FIG. 10B is a block diagram of an exemplary implicit provisioning model in accordance with the present disclosure.

FIG. 13A is a diagram of an exemplary implementation of the SDN configuration manager in which the SDN configuration manager is software being run by a control module of a node.

FIG. 13B is a diagram of another exemplary implementation of the SDN configuration manager in which the SDN configuration manager is being run on the host system.

FIG. 13C is a diagram of another exemplary implementation of the SDN configuration manager in which the SDN configuration manager is being run on a cloud-based processing system.

DETAILED DESCRIPTION

Figure 1:
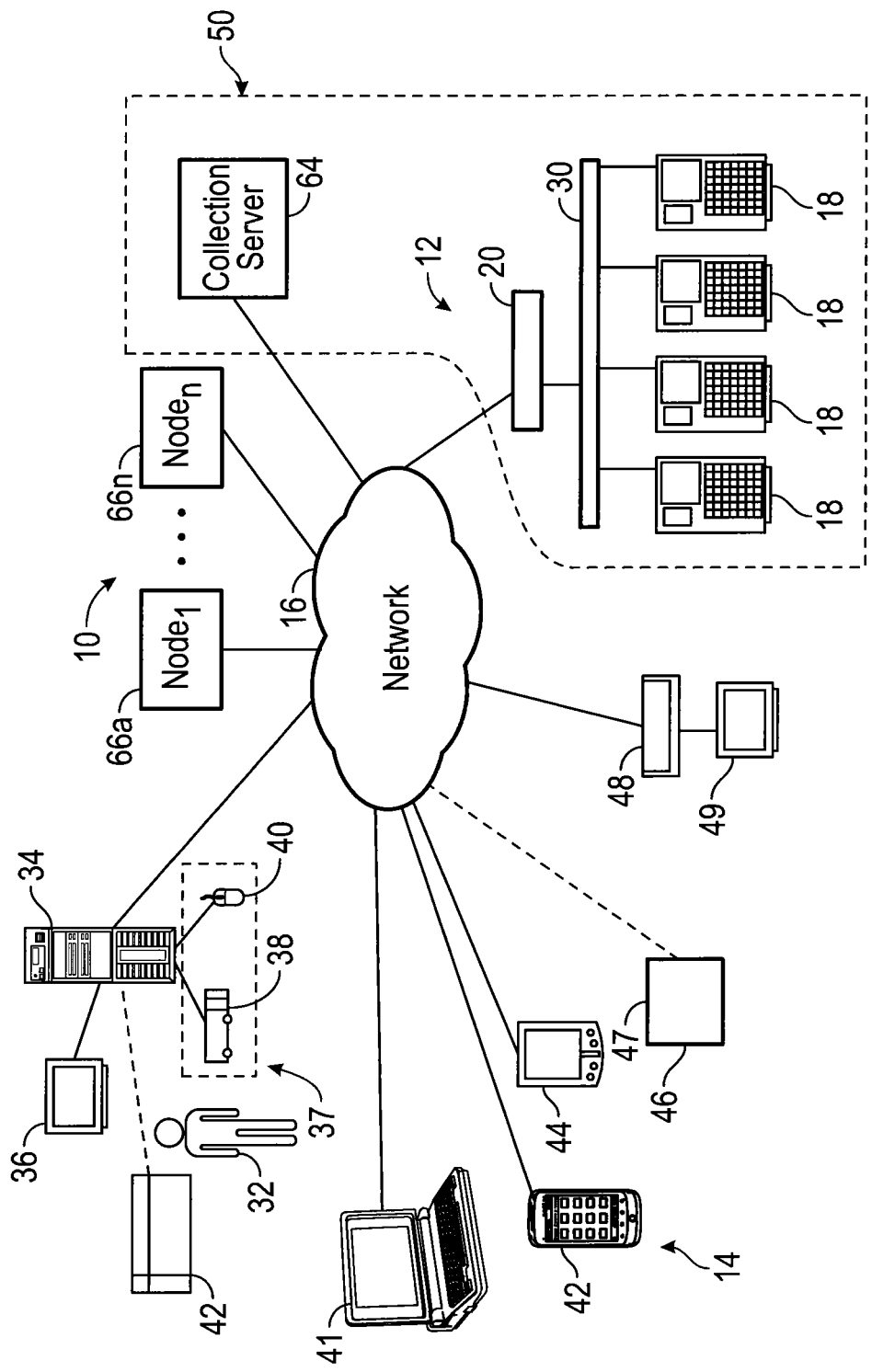
FIG. 1 is a schematic diagram of hardware forming an exemplary embodiment of a computer system constructed in accordance with the present invention.

The following detailed description refers to the accompanying drawings. The same reference numbers in different drawings may identify the same or similar elements.

The mechanisms proposed in this disclosure provide additional flexibility in the management, configuration, discovery, monitoring and provisioning of the transport network. The present disclosure describes methods and systems which enhance the management and provisioning of transport networks which may conform to the GMPLS protocols, for example. In some embodiments, the transport network is provided with a plurality of nodes with at least some of the nodes having a control module having a first processor accessing a first database storing first network node configuration information and being configured to compute a first path to a destination node within the transport network through the output interface with the first network node configuration information. Once the first path is computed, then the first processor sends first signals, which can conform to RSVP or RSVP-TE signaling protocols to other nodes on the first path so that the other nodes will be configured to be a part of the first path. The first processor can be a component of a headend node of the first path.

The transport network is also provided with a SDN configuration manager that may be separate from the plurality of nodes. The SDN configuration manager has a second processor accessing a second database storing second network node configuration information and being configured to compute a second path from a headend node (that does not include the second processor) to a tailend node of the plurality of nodes, updating the second network configuration information with information indicative of the second path, and sending second signals to at least the headend node and the tailend node to set up and enable the second path. The second signals may conform to the protocol of the first signals, or may utilize a different protocol such as a protocol referred to in the art as "OpenFlow."

Utilizing first and second processors with the first processor being a part of the headend node of the paths computed by the first processor within the transport network, and the second processor being separate from the headend node of at least some of the paths computed by the second processor within the transport network provides additional flexibility in the management, configuration, discovery, monitoring and provisioning of the transport network as will be discussed below.

The first processor may execute "implicit provisioning" in which a SDN configuration manager 50 instructs the headend node to compute the path. In this case, the creation of required cross-connects may be handled by the GMPLS control plane running on the network elements.

The second processor may execute "explicit provisioning" in which the SDN configuration manager 50 computes the path and also instructs network elements to create any required cross-connects. In this scenario, the GMPLS control plane running on the network elements is not required for path computation purposes.

In one embodiment, a node may include an input interface for receiving traffic from a first communication link; an output interface for transmitting traffic to a second communication link; a switch for communicating the traffic from the input interface to the output interface; and a control module located proximate to the input interface, output interface and the switch, the control module comprising a communication interface configured to connect to a third communication link external to the node, the control module having a processor accessing network node configuration information and being configured to compute a path to a destination node through the output interface with the network node configuration information and also configured to be switched from a first state in which the processor provides first instructions to the switch to configure the switch to communicate the traffic from the input interface to the output interface, to a second state in which the processor provides second instructions, received via the communication interface, to the switch to configure the switch to communicate traffic from the input interface to the output interface.

In one embodiment, a network may include a plurality of communication links; a first node and a second node, the first node having a control module with a first processor computing a first path to the second node through at least a first one of the plurality of communication links, storing first network configuration information indicative of the first path, and sending a first signal to the second node to enable the second node to form a part of the first path; a third node and a fourth node, the third node coupled with the fourth node, via at least a second one of the plurality of communication links. The network may also include a SDN configuration manager that is separate from the third node and the fourth node, the SDN configuration manager having a second processor computing a second path from the third node to the fourth node through at least the second one of the plurality of communication links, storing second network configuration information indicative of the second path, and sending second signals to the third node and the fourth node to enable the third node to be a headend node of the second path, and the fourth node to be a tailend node of the second path.

In one embodiment, a network control apparatus may include a node, comprising a first input interface; a second input interface; a first output interface; a second output interface; a switch for communicating traffic from the first and second input interfaces to the first and second output interfaces. The node may also include a control module located proximate to the first and second input interfaces, the first and second output interfaces and the switch, the control module having first configuration information to enable a first processor of the control module to configure the switch to direct traffic from the first input interface to the first output interface; and a SDN configuration manager that is separate from the control module, the SDN configuration manager having second configuration information to enable a second processor of the controller to configure the switch to direct traffic from the second input interface to the second output interface.

In one embodiment, a node may include an input interface for receiving traffic from a first communication link, the input interface having first resources and second resources that are allocable to receiving traffic from the first communication link; an output interface for transmitting traffic to a second communication link; a switch for communicating the traffic from the input interface to the output interface; and a control module located proximate to the input interface, output interface and the switch, the control module comprising a communication interface configured to connect to a third communication link external to the node, the control module having a processor accessing network node configuration information and being configured to compute a path to a destination node through the output interface with the network node configuration information and also configured with a state in which the processor provides first instructions to the switch to configure the switch to allocate at least a portion of the first resources to communicate the traffic from the input interface to the output interface, and provides second instructions, received via the communication interface, to the switch to allocate at least a portion of the second resources to communicate traffic from the input interface to the output interface.

DEFINITIONS

If used throughout the description and the drawings, the following short terms have the following meanings unless otherwise stated:

API stands for Application Program Interface.

APS stands for Automatic Protection Switching.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF publishes Requests for Comment (RFC) detailing proposed standard protocols.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance.

OTN stands for Optical Transport Network which includes a set of optical switch nodes which are connected by optical fiber links. ITU-T recommendations G.709 and G.872 define OTN interface requirements and network architecture respectively.

SDN stands for Software defined networking. SDN, as used herein, includes software, which may be executed by hardware that is separate from switch nodes within the optical transport network, and which includes the functionality to compute and provision paths through the optical transport network for multiple switch nodes as well as instruct one or more switch nodes to compute paths through the optical transport network.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

Network Priority refers to Setup & Holding priority as defined in RFC 3209, "RSVP-TE: Extensions to RSVP for LSP Tunnels", December 2001. In general, network priorities are assigned to connections in a shared mesh network and utilized to indicate which connections take precedent over other connections.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and in particular to FIG. 1, shown therein and designated by a reference numeral 10 is an exemplary computer system constructed in accordance with the present disclosure. The computer system 10 is a system or systems that are able to embody and/or execute the logic of the processes described herein. The logic embodied in the form of software instructions, or firmware may be executed on any appropriate hardware which may be a dedicated system or systems, or a personal computer system, or distributed processing computer system.

Preferably, the computer system 10 is distributed, and includes a host system 12, communicating with one or more user devices 14 via a network 16. In some embodiments, the host system 12 is used to implement the functionality of a SDN configuration manager, which is discussed below. The network 16 can be the Internet or other network. In either case, the host system 12 typically includes one or more servers 18 configured to communicate with the network 16 via one or more gateways 20. When the network 16 is the Internet, the primary user interface of the computer system 10 is delivered through a series of web pages, but the primary user interface can be replaced by another type of interface, such as a Windows-based application. This method is also used when deploying the computer system 10 in a stand-alone environment such as a kiosk.

The network 16 can be almost any type of network although Internet and Internet 2 networks are preferred because of the wide support of their underlying technologies. The preferred embodiment of the network 16 exists in an Internet environment, which means a TCP/IP-based network. It is conceivable that in the near future, the preferred or other embodiments, may wish to use more advanced networking topologies.

The servers 18 can be networked with a LAN 30. The gateway 20 is an entity responsible for providing access between the LAN 30 and the network 16. The gateway 20 can also be used as a security means to protect the LAN 30 from attack from external networks such as the network 16.

The LAN 30 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one preferred embodiment, the host system 12 includes the servers 18. The configuration of the server hardware will depend greatly upon the requirements and needs of the particular embodiment of the computer system 10. Typical embodiments, including the preferred embodiment, will include multiple servers 18 with load balancing to increase stability and availability. It is envisioned that the servers 18 will include database servers and application/web servers. The database servers are preferably separated from the application/web servers to improve availability and also to provide the database servers with improved hardware and storage.

The user devices 14 can be any number and type of devices. The most typical scenario of the user device 14 involves an end user 32, using a computer 34 with a display 36, and one or more input device 37, such as a keyboard 38, and mouse 40. The display 36 can be a single monitor or multiple adjacent monitors. Typically, the user device 14 uses a type of software called a "browser" as indicated by a reference numeral 42 to render HTML/XHTML content that is generated when requesting resources from a source, such as the host system 12. In the preferred embodiment, the computer system 10 is designed to be compatible with major Web Browser vendors (Microsoft Internet Explorer, Mozilla Firefox, Google Chrome, Opera, and the like) and the host system 12 can be organized as a web site. Other embodiments may wish to focus on one particular browser depending upon the common user base using the computer system 10.

The user devices 14 can also be implemented as a portable device such as a laptop computer 41 (or handheld computer); a cellular telephone 42 with a micro or embedded Web Browser; a Portable Digital Assistant 44 (PDA) capable of wireless network access; a pen-based or tablet computer 46 having a touchscreen 47. In another embodiment, the user device 14 can be a cable box 48 or other similar device for viewing through a display 49 or television. Current embodiments of computer system 10 can also be modified to use any of these or future developed devices.

The computer system 10 is designed in this way as to provide flexibility in its deployment. Depending upon the requirements of the particular embodiment, the Engine could be designed to work in almost any environment such as a desktop application, a web application, or even simply as a series of web services designed to communicate with an external application.

The hardware and system software are designed with two key concerns; flexibility and scalability. Although some specifics for software and hardware components may be mentioned herein, it will be understood that a wide array of different components could be substituted, such as using different database vendors or even replacing the databases with XML-based document stores.

When the computer system 10 is used to execute the logic of the processes described herein, such computer(s) and/or execution can be conducted at a same geographic location or multiple different geographic locations. Furthermore, the execution of the logic can be conducted continuously or at multiple discrete times.

Figure 3:
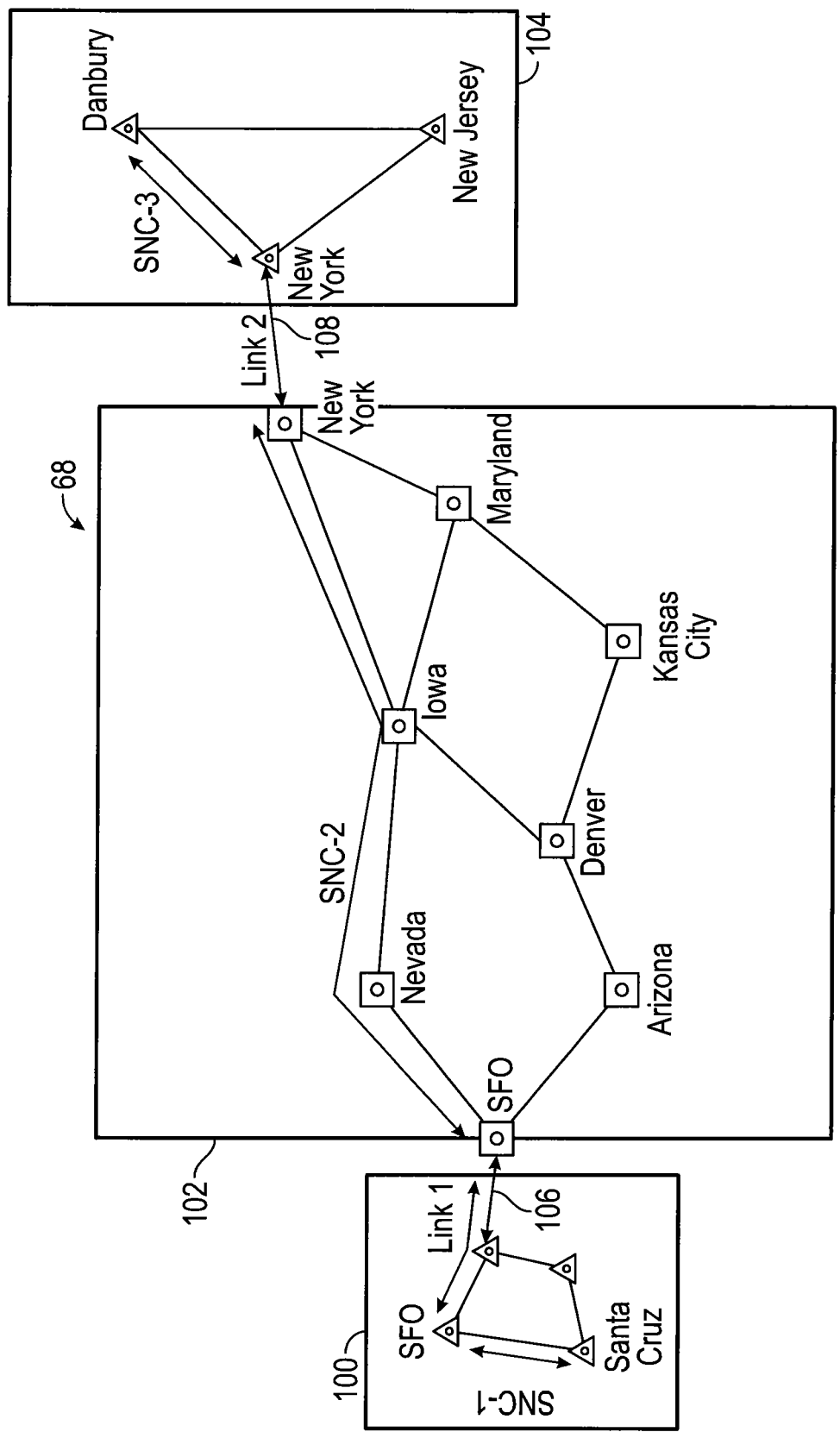
FIG. 3 is a block diagram showing an exemplary transport network including two metro networks connected by a core transport network to form a communication service between two different metropolitan areas.

The computer system 10 is further provided with a SDN configuration manager 50 comprised of a collection server 64 and the host system 12 for managing a plurality of nodes 66a-66n cooperating to form at least a part of a transport network 68, which is shown in FIG. 3. The collection server 64 communicates with the nodes 66a-66n via the network 16 and serves to collect network topology information internal to at least some of the nodes 66a-66n, as well as network topology information external to the nodes 66a-66n. The SDN configuration manager 50 utilizes the network topology information to compute paths, set up the paths, activate/deactivate the paths and report network state information to customers and others via the user devices 14. To obtain network configuration information, set up the paths, and/or activate/deactivate the paths the SDN configuration manager 50 may communicate messages directly with the nodes 66a-66n via the network 16. Alternatively, one or more of the nodes 66a-66n may act as a proxy for other nodes 66a-66n to increase the scalability and flexibility in deploying the computer system 10. For example, the node 66a may act as a proxy for nodes 66b-66d. In this instance, a message intended for node 66b would be delivered by the SDN configuration manager 50 to the node 66a, which would forward the message to the node 66b. Using certain of the nodes 66a-66n to act as proxies for other nodes 66a-66n to obtain network configuration information, set up the paths, and/or activate/deactivate the paths increases the scalability and flexibility in deploying the computer system 10. The nodes 66a-66n may communicate with each other using the network 16. Network configuration information can be obtained by the nodes 66a-66n exchanging identification information between interfaces, for example.

As will be discussed in more detail below, the SDN configuration manager 50 may utilize a transport network protocol such as GMPLS to compute and/or manage the paths within the transport network 68. Another protocol such as one referred to in the art as "OpenFlow" may be used to communicate with the nodes 66a-66n to set up, activate or deactivate the paths within the transport network 68.

Figure 2:
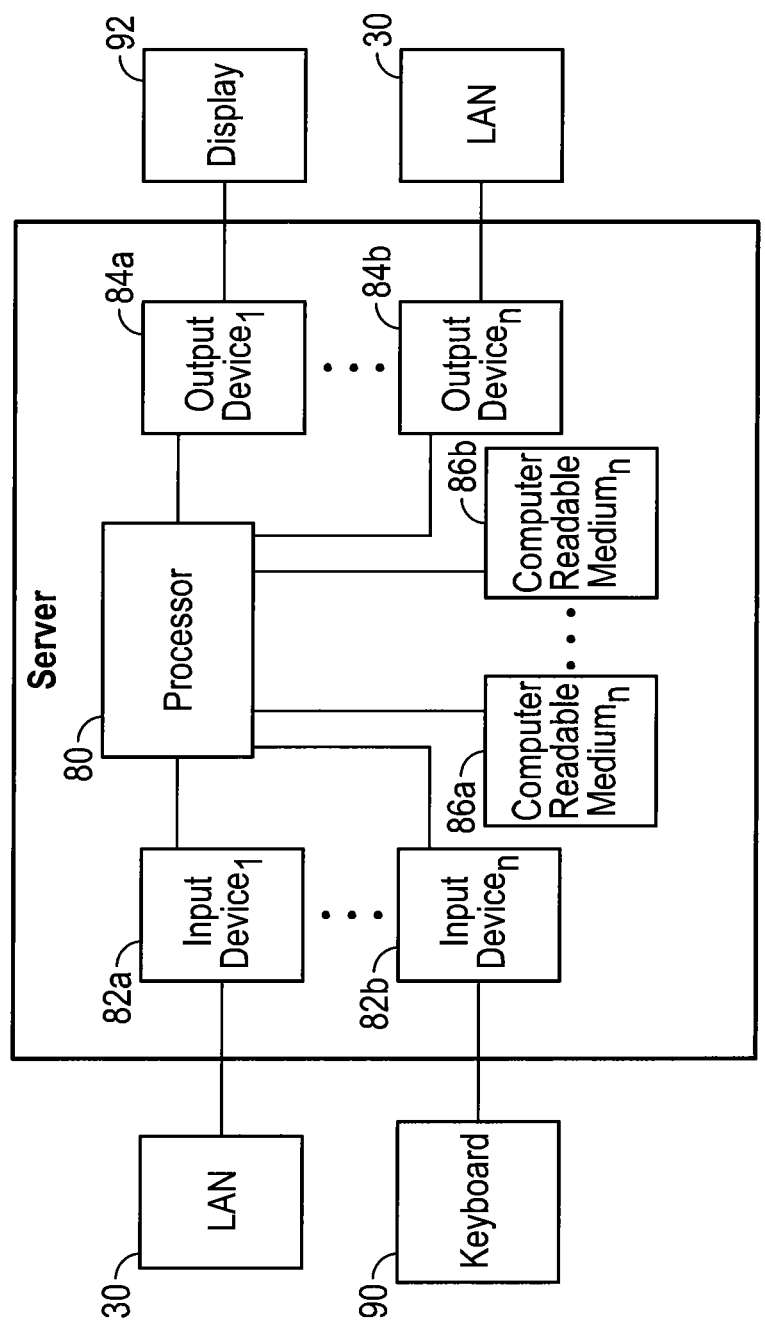
FIG. 2 is a block diagram showing a server receiving information indicative of managed entities, processing such information into graphing data and storing the graphing data onto one or more computer readable medium in accordance with the present disclosure.

A hardware diagram of one of the servers 18 is shown in FIG. 2. In general, the server 18 is provided with one or more processor 80 (which is referred to hereinafter as "the processor 80"), one or more input device 82, one or more output device 84 and one or more computer readable medium 86 (hereinafter referred to as the "computer readable medium 86"). Two input devices 82 are shown in FIG. 2 and designated by reference numerals 82a and 82b for purposes of clarity. The input devices 82 function to receive information and to supply the information to the processor 80 and can be constructed in various types or manners. For example, the input device 82a can be adapted to communicate with the one or more of the other servers 18, the collection server 64 and/or one or more of the user devices 14 with the LAN 30, and the input device 82b can be adapted to communicate with a keyboard 90. The input device 82b can be a serial device, for example.

Two output devices 84 are shown in FIG. 2 and designated by reference numerals 84a and 84b for purposes of clarity. The output devices 84 function to supply information from the processor 80 to another device and can be constructed in various types or manners. For example, the output device 84a can be a video controller adapted to communicate with a display 92 (having one or more monitor), and the output device 84b can be adapted to communicate with the one or more of the other servers 18, the collection server 64 and/or one or more of the user devices 14 with the LAN 30 utilizing any suitable protocol.

The processor 80 as shown in FIG. 2 is capable of communicating with the computer readable medium 86 as well as reading and/or executing the computer executable code. The processor 80 can be located at any location relative to the computer readable medium 86, as long as the processor 80 is able to communicate with the computer readable medium 86. The processor 80 may, for example, be implemented as one or more microprocessors, one or more microcontrollers, one or more field-programmable gate arrays, one or more digital signal processors, or the like. It is to be understood that the processor 80 may contain one, two, three, or a plurality of: microprocessors, microcontrollers, field-programmable gate arrays, digital signal processors, or the like, or any combination thereof.

Shown in FIG. 3 is the transport network 68 for communicating between San Francisco and New York, for example. The transport network 68 is formed by a plurality of interconnected managed entities. The managed entities can be any structures within the transport network 68 that are capable of receiving and transporting information. The structure and type of the managed entities can vary and typical examples of managed entities include sub-network connections, cross-connects, ports, links, manual circuits, protection connections and the like which cooperate to form the transport network 68. For example, the transport network 68 may include the following managed entities: a first sub-network connection 100, a second sub-network connection 102, a third sub-network connection 104, a first link 106 connecting the first sub-network connection 100 and the second sub-network connection 102 in San Francisco, as well as a second link 108 connecting the second sub-network connection 102 and the third sub-network connection 104 in New York. In the example shown in FIG. 3, the first sub-network connection 100 and the third sub-network connection 104 can be considered metro networks and the second sub-network connection 102 can be considered a core transport network. The first, second and third sub-network connections 100, 102, and 104 generally extend between Santa Cruz, Calif. and Danbury, N.Y. and can be made up of two different hardware types including a reconfigurable switched DWDM system utilizing GMPLS-enabled end-end service intelligence for the core transport network, and a DWDM/CWDM system including a ring topography for the metro networks.

Sub-networks 100 and 104 may be Ethernet/packet networks and sub-network 102 may be a WDM/Transport network. In current systems, sub-networks 100, 102, 104 are handled by separate departments/network operations, causing delays and increase operational costs for creating end to end service orders.

A sub-network connection (referred to herein as a "SNC") is a logically divided sub-division of the transport network 68. A sub-network connection preferably has the following attributes:

1. Source Endpoint: Source End point at which the SNC Starts
2. Destination Endpoint: Destination End point at which the SNC Ends
3. Service Rate: Indicates the type of data traffic the SNC will carry. The Type of traffic itself indicates whether the SNC is channelized or not.
4. Protection Group Type: Tell what kind of Protection exists for this SNC (if it exists).

A link can be a physical link managed by software as a managed entity that is used to connect two sub-network connections together to establish communication there between.

Assuming that a customer desires to setup a telecommunication service from Santa Cruz, Calif. to Danbury, N.Y. the following steps should be followed:

1. User creates a Circuit (SNC) in the San Francisco ("SFO") metro network—SNC-1 (identified in FIG. 3 as the first sub-network connection 100).

2. User creates a Circuit (SNC) in the core transport network between SFO to New York—SNC-2 (identified in FIG. 3 as the second sub-network connection 102).

3. User creates a Circuit (SNC) in the New York metro network—SNC-3 (identified in FIG. 3 as the third sub-network connection 104).

4. After that User has to connect the SNC-1 to SNC-2 using a Link-1 (between 2 different types of nodes and identified in FIG. 3 as the first link 106).

5. Similarly user connects SNC-2 TO SNC-3 using Link-2 (between 2 different types of nodes and identified in FIG. 3 as the second link 108).

These five steps create five different managed entities, the first sub-network connection 100, the second sub-network connection 102, the third sub-network connection 104, the first link 106 and the second link 108. In the past, the customer can manage these five managed entities individually and make sure that the customer signals are handled by those five entities properly. However, the computer system 10 in accordance with the present disclosure may consolidate the five managed entities and provides a single Network Sub-Network Connection (SNC) creating, in essence, a virtual overlay indicative of the five managed entities. A Network SNC is a single management service for a customer which can be displayed graphically to the customer via the user devices 14. As will be described below, the computer system 10 manages and interprets many different kinds of managed entities and merges them into a single Network SNC for the customer. Multiple Network SNCs can be created for each customer, or a single Network SNC can be created for each customer. In either instance, this greatly simplifies the management of the managed entities for the customer because the virtual overlay provides a graphical illustration of the state of the resources within the transport network 68 that are allocated to the customer.

Figure 4:
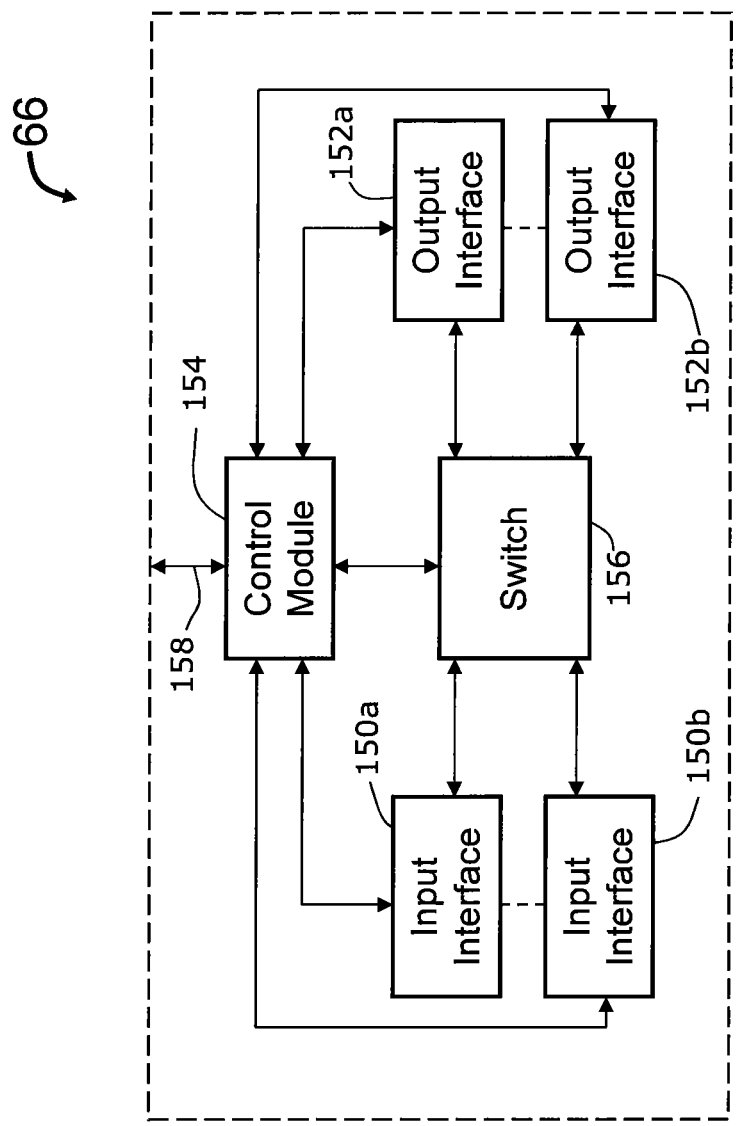
FIG. 4 is a block diagram of an exemplary node constructed in accordance with the present disclosure.

Referring now to FIG. 4, shown therein and designated by reference numeral 66 is a block diagram of an exemplary node constructed in accordance with the present disclosure. The node 66 is adapted to facilitate the communication of data (which may be referred to herein as "traffic") between multiple nodes 66 in the transport network 68. The transport network 68 may be, for example, an optical transport network (OTN).

The node 66 is provided with one or more input interfaces 150, one or more output interfaces 152, a control module 154, and a switch 156. In general, the input interfaces, shown here as 150a and 150b, are adapted to receive traffic from the transport network 68, and the output interfaces, shown here as 152a and 152b, are adapted to transmit traffic onto the transport network 68. The switch 156 serves to communicate the traffic from the input interfaces 150a and 150b, to the output interfaces 152a and 152b. And, the control module 154 serves to control the operations of the input interfaces 150a and 150b, the output interfaces 152a and 152b, and the switch 156, as well as to compute and set up label switched paths (LSP) or statically provisioned manual cross-connect within the transport network 68 having a headend node and a tail end node, of which the control module 154 is a component of the headend node. The node 66 may also include non-transitory memory (not shown), either within the control module 154 and/or the switch 156, or separate from the control module 154 and/or the switch 156 which stores a database having network configuration information indicative of the topology of the transport network 68, and an internal topology of at least some of the nodes 66 within the transport network 68.

The node 66 can be implemented in a variety of ways, including, commercial installations having one or more backplanes (not shown), racks, and the like. In this example, the input interface(s) 150, the output interface(s) 152, the control module 154 and the switch 156 are typically implemented as separate devices, which may have their own power supply, local memory and one or more processor (referred to hereinafter as the "processor"), but which are installed within the same rack or installation of racks. In another example, the node 66 can be implemented as a single device having a shared power supply, memory and processing equipment. Or, in another example, the node 66 can be implemented in a modular manner in which one or more of the input interface(s) 150, the output interface(s) 152, the control module 154 and the switch 156 share a power supply and/or housing.

Figure 7:
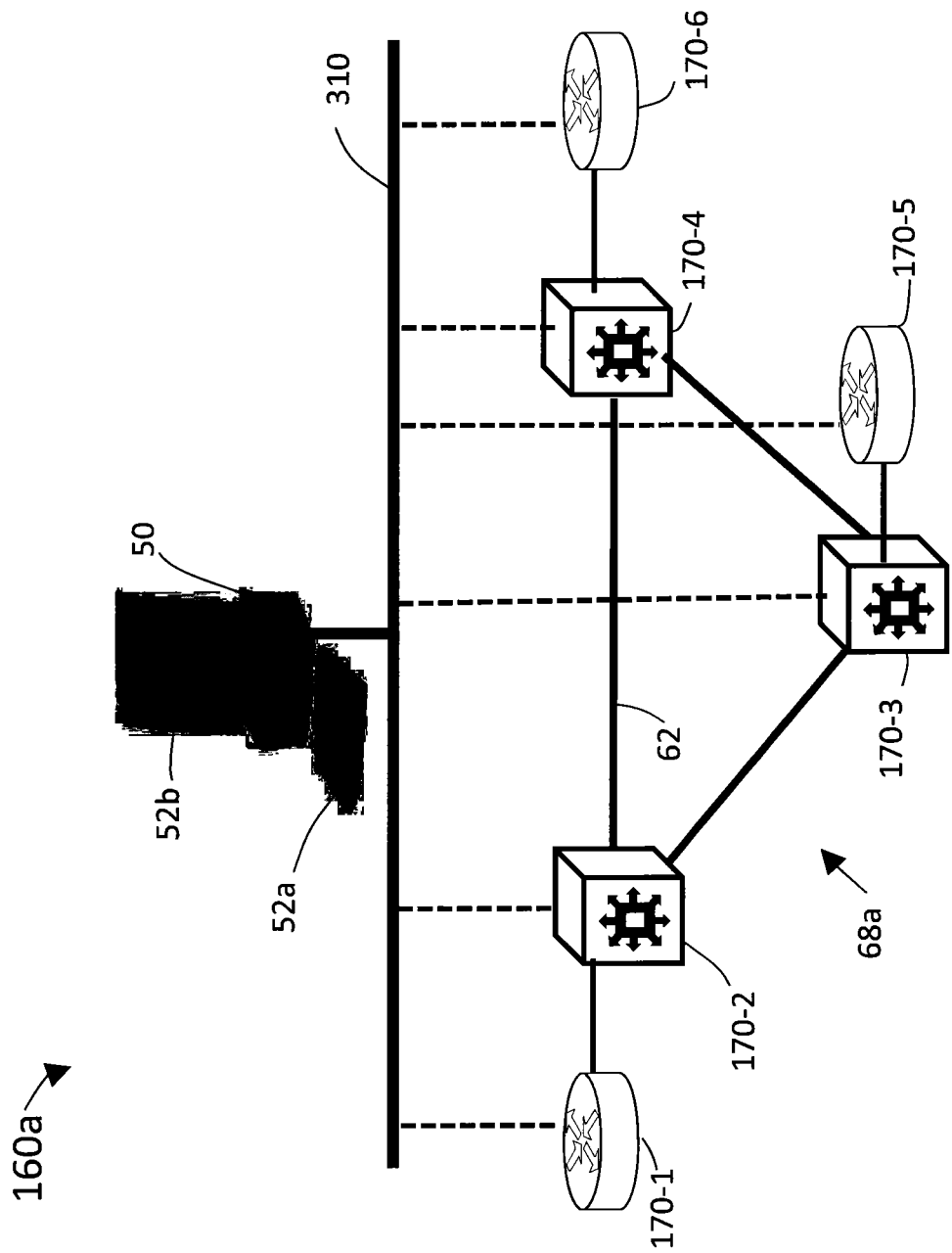
FIG. 7 is a diagram of another exemplary environment in which systems and/or methods described herein may be implemented.

The input interface(s) 150 and the output interface(s) 152 of one node 66 are adapted to communicate with corresponding input interface(s) 150, and output interface(s) 152 of another node 66 within the transport network 68 via communication links 62, as shown in FIG. 7. An example of an input interface 150 and/or an output interface 152 is an Ethernet card or optical port. In general, each of the input interface(s) 150 and/or the output interface(s) 152 may have a unique logical identification, such as an IP address or Logical Port Number/Identifier. The input interfaces 150 and the output interfaces 152 may be of different combinations. For example, one or more input interfaces 150 may be Ethernet interfaces and one or more output interfaces 152 may be OTN interfaces.

The communication links 62 can be implemented in a variety of ways, such as a physical link including electrical (e.g., copper wire or coax) and/or optical signal (e.g., optical fiber or other waveguide) carrying capabilities, or as a wireless link. The communication links 62 can be fiber optic cables, electronics cables, wireless communication links, or the like.

The implementation of the input interface(s) 150, and the output interface(s) 152 will depend upon the particular type of communication link 62 that the particular input interface 150 and/or output interface 152 is designed to communicate with. For example, one of the input interfaces 150 can be designed to communicate wirelessly with another node 66 within the transport network 68, while one of the output interfaces 152 of the node 66 can be designed to communicate optically through a fiber-optic link. For a particular node 66, the input interfaces 150a and 150b can be of the same type or different types; the output interfaces 152a and 152b can be of the same type or different types; and the input interface(s) 150 and output interface(s) 152 can be of the same type or different types.

The input interface 150 and the output interface 152 are shown separately for purposes of clarity. However, it should be understood that one or more of the input interfaces 150 and/or the output interfaces 152 could be connected to a single communication link 62 and implemented as a single device, such as a line module. Exemplary line modules are described in U.S. Pat. No. 8,223,803 (Application Publication number 20090245289), the entire contents of which are hereby incorporated herein by reference.

As discussed above, the control module 154 has its own processing capabilities and memory and can execute transport network protocols. The control module 154 is also provided with a communication interface 158 configured to connect to a communication link which is external to the node 66. The control module 154 utilizes the communication interface 158 to communicate with control modules 154 of other nodes 66 within the transport network 68 to obtain network node configuration information of nodes and/or topologies within the transport network 68. The control module 154 may also utilize the communication interface 158 to communicate with the SDN configuration manager 50, as discussed above.

The processing capabilities of the control module 154 may be implemented as one or more processors as discussed above. The network node configuration information can be stored within a database that is stored within the memory of the control module 154. To set up a path within the transport network 68, a signal can be sent to the control module 154 via the communication interface 158 including an identification of a particular interface on a destination node within the transport network 68. In this case, the control module 154 of the node 66 will be the headend node of the path to be set up within the transport network 68. The processor of the control module 154 receives the signal including the identification of the destination node, and accesses network node configuration information from the database (including information indicative of the particular interface and destination node) and computes a path to the destination node utilizing at least one of the output interfaces. Once the path is computed, the control module 154 provides instructions to the switch 156 to configure the switch 156 to communicate traffic from one or more of the input interfaces 150*a* and 150*b* to one or more of the output interfaces 152*a* and 152*b*. The control module 154 also sends signals, which can conform to RSVP or RSVP-TE signaling protocols to other nodes on the path so that the other nodes will be configured to be a part of the path.

The control module 154 is also programmed and/or configured to be switched between a variety of different states to work together with the SDN configuration manager 50 to manage, setup and/or configure the node 66, and/or the transport network 68. In one state, the control module 154 runs the transport network protocol such as GMPLS to compute paths, signal other nodes 66 with network configuration information, as well as to set up and activate paths within transport network 68. In another state, the tasks associated with computing paths, signaling other nodes 66 with network configuration information, as well as to setting up and activating paths within the transport network 68 are allocated to the SDN configuration manager 50. In this state, instructions received from the SDN configuration manager 50 via the communication interface for setting up and activating paths within the transport network are provided from the control module 154 to the switch 156 to configure the switch 156 to communicate traffic from one or more of the input interfaces 150 to one or more of the output interfaces 152.

The control module 154 may also be programmed with instructions establishing the control module 154 and the SDN configuration manager 50 to work together to allocate resources provided by one or more of the input interfaces 150 and output interfaces 152. For example, the input interface 150*a* may be able to receive 500 Gb of bandwidth which may be divided up among a variety of resources, such as time slots or wavelengths. In this instance, certain of the resources of the input interface 150*a* may be allocated to be managed by the control module 154 and others of the resources of the input interface 150*a* may be allocated to be managed by the SDN configuration manager 50. For example, 200 Gb may be allocated to the control module 154 and the remaining 300 Gb may be allocated to the SDN configuration manager 50. In this state, when a path is computed by the control module 154 that utilizes resources allocated to be managed by the control module 154, the control module 154 computes the path and then configures the switch 156 to allocate at least a portion of the first resources to communicate the traffic received from the input interface 150*a* to one or more of the output interfaces 152. When a path is computed by the SDN configuration manager involving the resources managed by the SDN configuration manager, the SDN configuration manager sends instructions to the control module 154 via the communication interface, which provides instructions to the switch 156 to allocate at least a portion of the second resources to communicate traffic from the input interface 150*a* to one or more of the output interfaces 152. The same state can be used to manage the resources of the other input interfaces 150 and output interfaces 152 of the node 66. Management of the states of the control module 154 can be implemented by setting bits within the memory of the control module 154 that can be interpreted by the processor of the control module 154. Likewise, allocation of particular resources of the input and output interfaces 150 and 152 can be implemented by setting bits within the memory of the control module 154, and bits within the memory of the SDN configuration manager 50. In some embodiments, information indicative of the management of the states and allocation of particular resources of the input and output interfaces 150 and 152 may be stored in one or more databases storing network node configuration information.

Figure 5:
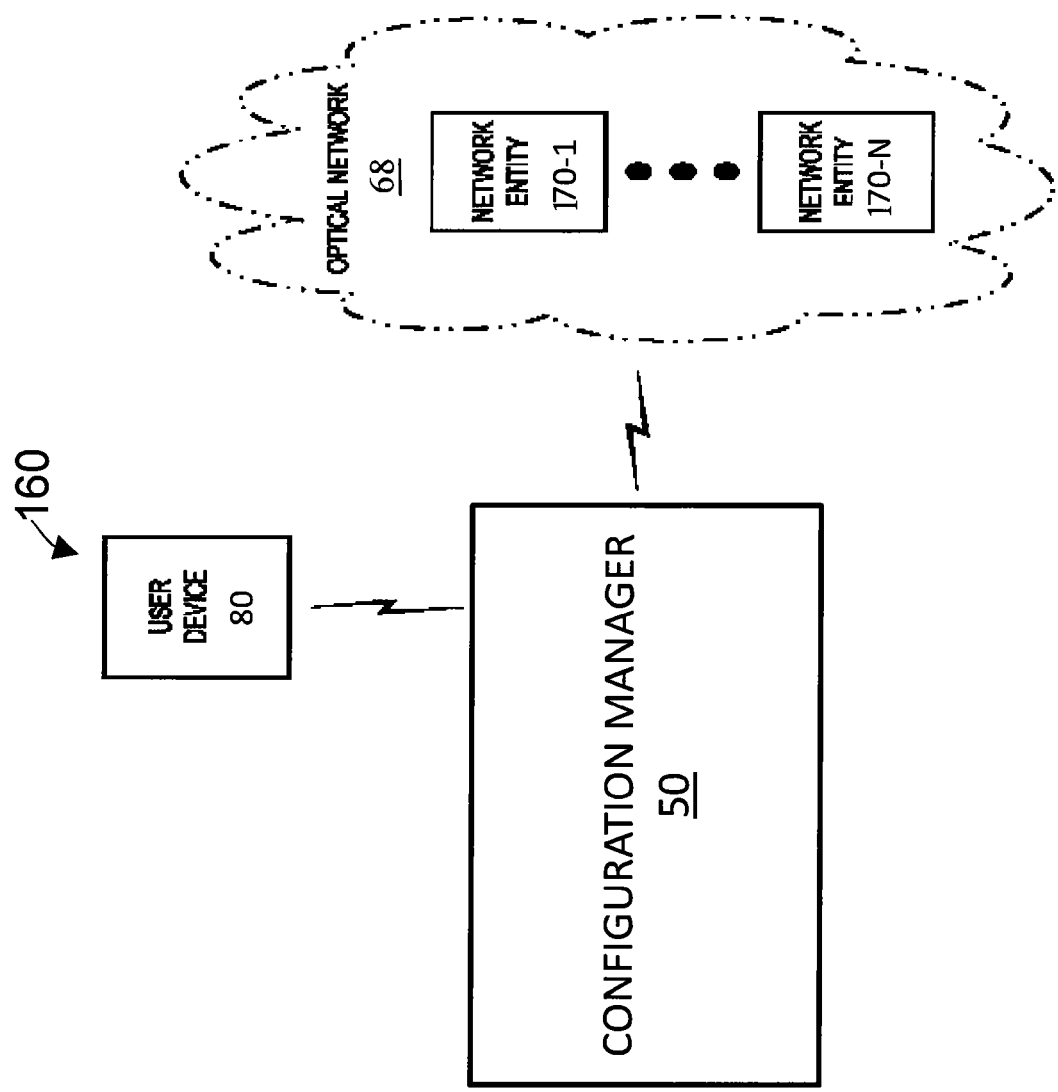
FIG. 5 is a diagram of an exemplary environment in which systems and/or methods described herein may be implemented.

FIG. 5 is a diagram of an example environment 160 in which systems and/or methods described herein may be implemented. Environment 160 may include the SDN configuration manager 50 (which can be implemented as the host system 12 described above) and the transport network 68 that includes one or more network entities 170-1 through 170-N (N≥1) (hereinafter referred to individually as "NE 170" and collectively as "NEs 170"). The nodes 66*a*-66*n* may be network entities 170.

The number of devices and/or networks illustrated herein is provided for explanatory purposes. In practice, there may be additional devices and/or networks, fewer devices and/or networks, different devices and/or networks, or differently arranged devices and/or networks than are shown in FIG. 5. Furthermore, two or more of the devices illustrated in FIG. 5 may be implemented within a single device, or a single device illustrated in FIG. 5 may be implemented as multiple, distributed devices. Additionally, or alternatively, one or more of the devices of environment 160 may perform one or more functions described as being performed by another one or more of the devices of environment 160. Devices of environment 160 may interconnect via wired connections, wireless connections, or a combination of wired and wireless connections.

SDN configuration manager 50 may include one or more devices that gather, process, search, store, and/or provide information in a manner described herein. The SDN configuration manager 50 may also be referred to as an orchestration console or network controller. SDN configuration manager 50 may receive and/or store network information regarding multiple layers within the transport network 68 via the collection server 64, for example. The SDN configuration manager 50 may receive and/or store information regarding network configuration, which may include a quantity, location, capacity, status, and/or configuration of NEs

170; failure information, communication priority, characteristics and/or configurations (e.g., capacity) of paths and/or super-channels between NEs 170; traffic demands of NEs 170 and/or super-channels between NEs 170; and/or any other network configuration information associated with the network 68 (e.g., optical device configurations, digital device configurations, etc.) within a database.

Network topology information may be determined by using standard topology discovery procedures. NEs 170 may provide network information to the collection server 64, which is then forwarded or accessed by the SDN configuration manager 50, for example, through messages to the collection server 64 and/or the SDN configuration manager 50.

SDN configuration manager 50 may control one or more of the NEs 170. SDN configuration manager 50 may use any Application Program Interface (API) to discover information about the network topology of and/or to setup and/or control the NEs 170, non-exclusive examples of which include NETCONF, REST, OpenFlow, TL1, etc., to discover/configure/reconfigure NEs 170 and to support protection/recovery mechanisms.

SDN configuration manager 50 may provide information associated with the network configuration changes to the transport network 68 and/or NEs 170 in order to allocate network bandwidth and/or super-channels based on the network information, such as link failures and path priorities.

Figure 6:
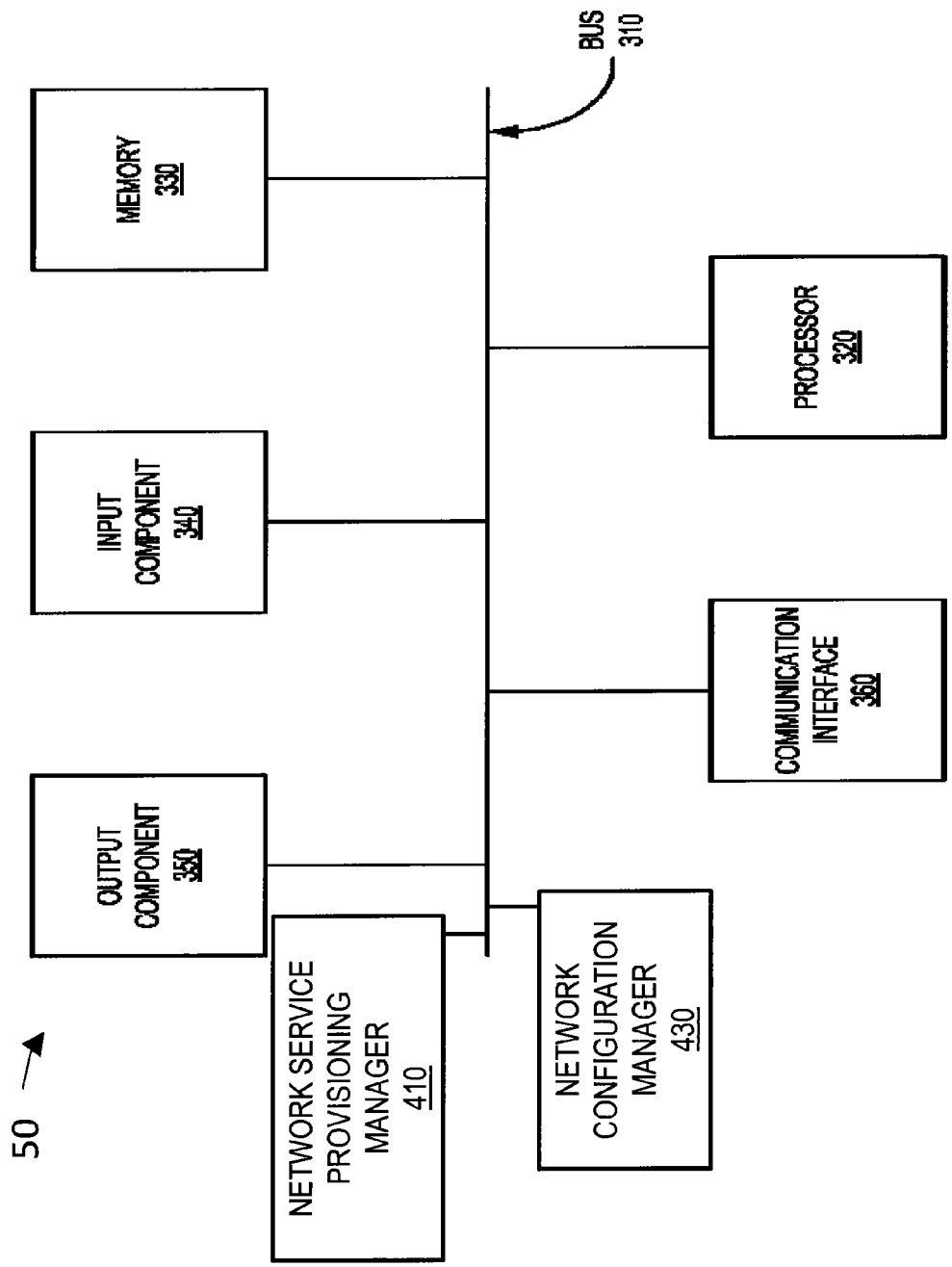
FIG. 6 is a schematic diagram of an exemplary SDN configuration manager in accordance with the present disclosure.

FIG. 6 is a diagram of example components of the SDN configuration manager 50. Of course, the SDN configuration manager 50 components may be distributed into multiple devices, some of which includes components of the host system 12, and the NEs, or other devices in and/or outside of the network 68.

SDN configuration manager 50 may include a bus 310, a processor 320, a memory 330, an input component 340, an output component 350, and a communication interface 360. In some implementations, SDN configuration manager 50 may include additional components, fewer components, different components, or differently arranged components than those illustrated in FIG. 6.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that may interpret and execute instructions. Memory 330 may include a random access memory ("RAM"), a read only memory ("ROM"), and/or any type of dynamic or static storage device (e.g., a flash, magnetic, or optical memory) that may store information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes ("LEDs"), etc.). Communication interface 360 may include any transceiver-like mechanism, such as a transceiver and/or a separate receiver and transmitter that enables device 300 to communicate with other devices and/or systems, such as via a wired connection, a wireless connection, or a combination of wired and wireless connections. For example, communication interface 360 may include mechanisms for communicating with the NEs 170. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

SDN configuration manager 50 may perform various operations described herein. SDN configuration manager 50 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

SDN configuration manager 50 may include a Network Service Provisioning Manager 410 and a Network Configuration Manager 430. Each of functional components 410-430 may be implemented using one or more components of SDN configuration manager 50. The functional components of SDN configuration manager 50 may be distributed singularly or duplicatively in any manner between NEs and/or devices external to the transport network 68. In some implementations, SDN configuration manager 50 may include other functional components (not shown) that aid in managing network configurations and allocating network resources. Network Service Provisioning Manager 410 may perform operations associated with managing a network configuration. In some implementations, Network Service Provisioning Manager 410 may receive network configuration information from NEs 170.

The initial network configuration information provided to Network Service Provisioning Manager 410 may be supplemented with network configuration information received from NEs 170. For example, NEs 170 may provide real-time network deployment information to update the initial network configuration information. For example, Network Service Provisioning Manager 410 may receive network configuration information from NEs 170 that identifies newly-deployed NEs 170 and/or new super-channels between NEs 170. Additionally, or alternatively, Network Service Provisioning Manager 410 may receive other network configuration information from NEs 170, such as super-channel allocation information that identifies super-channels that are available for optical transmission, assigned to transmit optical signals, currently being used to transmit optical signals, and/or blocked from transmitting optical signals.

Network Configuration Manager 430 may perform operations associated with configuring an optical network and/or network entities associated with an optical network. For example, Network Configuration Manager 430 may compute a path between a headend node and a tailend node and then supply signals to particular ones of the nodes 66a-66n and/or other NEs 170 that are on the path to cause the nodes 66a-66n and/or other NEs 170 to allocate resources to the path. Network Configuration Manager 430 may receive information associated with network configuration changes.

Network Configuration Manager 430 may communicate the information associated with the changes to NEs 170 (and/or other devices in optical network 60) so that the switches 156 may adjust their configuration in accordance with the network configuration changes. For example, Network Configuration Manager 430 may provide instructions to NEs 170 that indicate that NEs 170 are to reserve capacity (e.g., bandwidth) over one or more super-channels connecting NEs 170. In some implementations, Network Configuration Manager 430 may receive information validating a changed configuration from NEs 170, and may provide the configuration validation information to user device 14).

Returning now to FIG. 5, NEs 170 may include one or more devices that gather, process, store, and/or provide information in a manner described herein. For example, NEs 170 may include one or more optical data processing and/or traffic transfer devices, such as an optical node, an optical add-drop multiplexer ("OADM"), a reconfigurable optical add-drop multiplexer ("ROADM"), an optical multiplexer, an optical demultiplexer, an optical transmitter, and optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. In some implementations, NEs 170 may include OADMs and/or ROADMs capable of being configured to add, drop, multiplex, and demultiplex optical signals. NEs 170 may process and transmit optical signals to other NEs 170 throughout optical network 68 in order to deliver optical transmissions.

SDN configuration manager 50 may provide information associated with the network configuration changes to another device, such as user device 14, so that a user may interact with the SDN configuration manager 50 to determine the status of and/or configure the transport network 68.

The transport network 68 may include Layer 2/Layer 3 NEs 170 such as routers. Transport network 68 may include integrated ROADM and OTN NEs 170, providing L1 and L0 functionality. Network 68 may include communication links 62 between NEs 170 and/or the SDN configuration manager 50.

FIG. 7 is a diagram of another exemplary environment 160*a* in which systems and/or methods described herein may be implemented. In environment 160*a*, SDN configuration manager 50 may be in the form of a computer device having a user device 14, such as a computer with a keyboard 52*a* and a display 52*b*. The user device 14 may allow for the input or output of data. However, the SDN configuration manager 50 may be implemented with different user interfaces and/or devices as explained. The SDN configuration manager 50 may have a bus bar control mechanism 310*a*. The bus bar control mechanism 310*a* may be connected physically and/or logically to one or more of the NEs 170 in multiple layers of the network 68*a*. The bus bar control mechanism 310*a* may be used to control and/or configure/reconfigure NEs 170 in multiple layers of the network 68. In one embodiment, SDN configuration manager 50 may be in the form of a Software-Defined Networking (SDN) Controller.

In the network 68*a*, the NEs 170 may be connected by communication links 62.

In the example illustrated in FIG. 7, the NEs 170 include integrated ROADM and OTN network elements, NE 170-2, 170-3, and 170-4, which may provide Layer 1 and Layer 0 functionality. The NEs 170 also include Layer 2/Layer 3 network elements, NE 170-1, 170-5, 170-6.

The SDN configuration manager 50 and/or NEs 170 may configure one or more optical channels, such as one or more super-channels 500, to carry data through the network 60*b* over the NEs 170 and the communication links 62.

A super-channel 500, as used herein, may refer to multiple optical carriers 502 that are simultaneously transported over the same optical waveguide (e.g., a single mode optical fiber). Each optical carrier 502 included in a super-channel 500 may be associated with a particular optical wavelength (or set of optical wavelengths). The multiple optical carriers 502 may be combined to create a super-channel 500 using wavelength division multiplexing. For example, the multiple optical carriers 502 may be combined using dense wavelength division multiplexing, in which carrier-to-carrier spacing may be less than one nanometer. In some implementations, each optical carrier 502 may be modulated to carry an optical signal.

Figure 8:
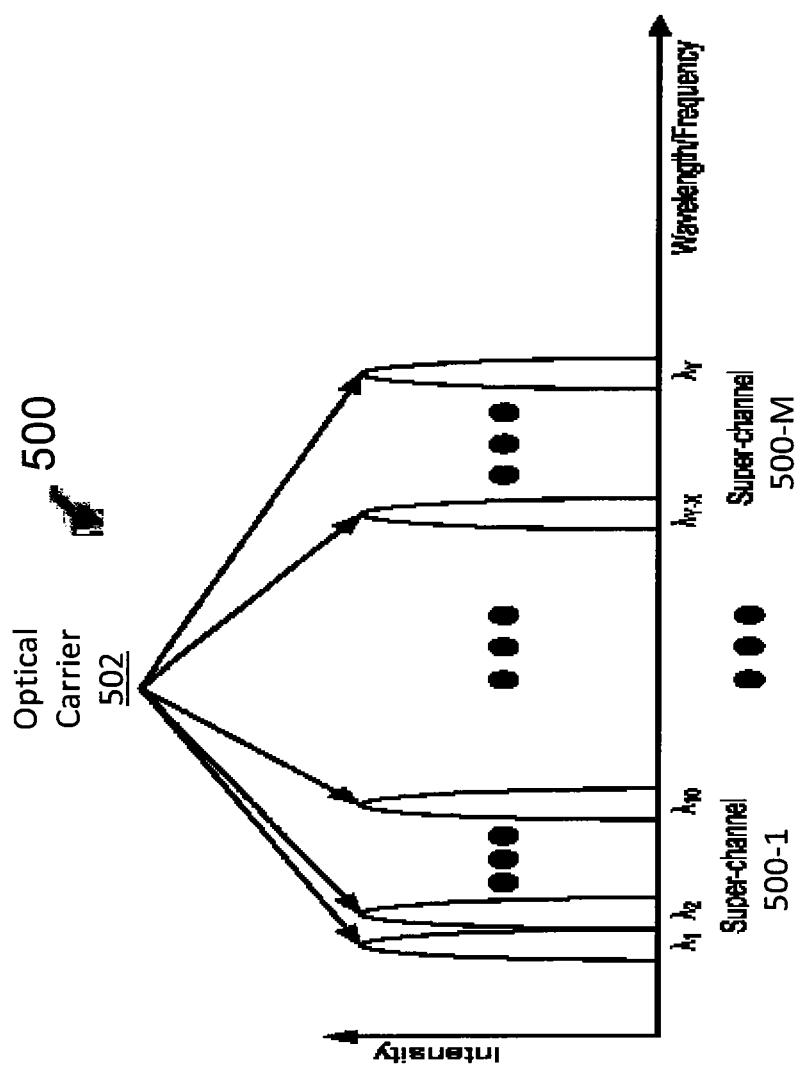
FIG. 8 is an example frequency and/or wavelength spectrum associated with super-channels.

An example frequency and/or wavelength spectrum associated with super-channels 500 is illustrated in FIG. 8. In some implementations, the frequency and/or wavelength spectrum may be associated with a particular optical spectrum (e.g., C Band, C+ Band, etc.). As illustrated, super-channel 500-1 may include multiple optical carriers 502, each of which corresponds to a wavelength λ (e.g., λ1, λ2, through λ10) within a first wavelength band. Similarly, super-channel 500-M may include multiple optical carriers 502, each of which corresponds to a wavelength λ (e.g., λY-X through λY) within a second wavelength band. The quantity of illustrated optical carriers 502 per super-channel 500 is provided for explanatory purposes. In practice, super-channel 500 may include any quantity of optical carriers 502.

Optical carrier 502 may be associated with a particular frequency and/or wavelength of light. In some implementations, optical carrier 502 may be associated with a frequency and/or wavelength at which the intensity of light carried by optical carrier 502 is strongest (e.g., a peak intensity, illustrated by the peaks on each optical carrier 502). In some implementations, optical carrier 502 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., λ1 and λ2) may be equal to or substantially equal to a bandwidth (or bit rate) associated with a data stream carried by optical carrier 502. For example, assume each optical carrier 502 included in super-channel 500-1 (e.g., λ1 through λ10) is associated with a 50 Gigabit per second ("Gbps") data stream. In this example, super-channel 500-1 may have a collective data rate of 500 Gbps (e.g., 50 Gbps×10). In some implementations, the collective data rate of super-channel 500-1 may be greater than or equal to 100 Gbps. Additionally, or alternatively, the spacing between adjacent wavelengths may be non-uniform, and may vary within a particular super-channel band (e.g., super-channel 500-1). In some implementations, optical carriers 502 included in super-channel 500 may be non-adjacent (e.g., may be associated with non-adjacent wavelengths in an optical spectrum).

Each super-channel 500 may be provisioned in transport network 68 as one optical channel and/or as an individual optical channel. Provisioning of an optical channel may include designating an optical route and/or path for the optical channel through transport network 68 and can be computed by either the control module 154 of the node 66 functioning as the head end node for the path, or the SDN configuration manager 50. For example, an optical channel may be provisioned to be transmitted via a set of NEs 170. In some implementations, NEs 170 may be configured as a ring. Additionally, or alternatively, NEs 170 may be configured in a point-to-point configuration. Provisioning may be referred to as "allocating" and/or "allocation" herein. Even though each super-channel 500 is a composite of multiple optical carriers 502, the optical carriers 502 included in super-channel 500 may be routed together through transport network 68. Additionally, or alternatively, super-channel 500 may be managed and/or controlled in transport network 68 as though it included one optical channel and/or one optical carrier 502 at one wavelength.

Figure 9:
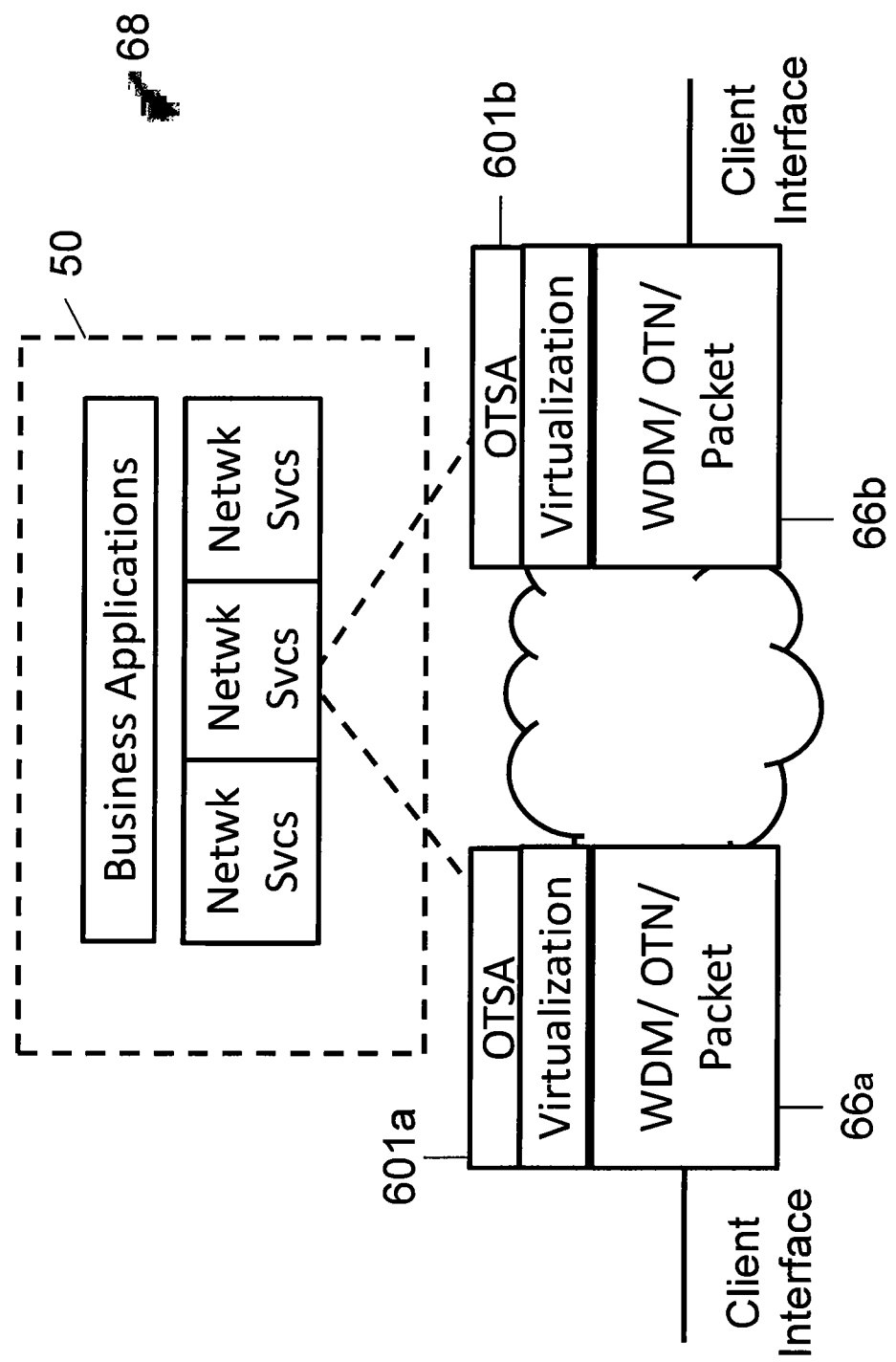
FIG. 9 is a schematic diagram of one implementation of a SDN configuration manager controlling nodes of the transport network in accordance with the present disclosure.

FIG. 9 is a schematic diagram of one implementation in accordance with the present disclosure. The exemplary environment includes the SDN configuration manager 50 loaded with and running business applications, and at least one network services application, and at least two nodes 66 communicating with one or more client interface. A non-exclusive example of a typical business application is Bandwidth-on-Demand integrated with managed customer VPN services. A non-exclusive example of a typical network service application is to provide North Bound Interface API to a business application. Nodes 66*a*, and 66*b* include a configuration application which will be referred to hereinafter as an "Open Transport Switching Application" or (OTSA) 601*a* and 601*b* that is stored by and run on control modules 154 of the nodes 66*a* and 66*b*. The OTSA 601*a* and 601*b* are adapted to establish communication with the SDN configuration manager 50 and also permit the SDN configuration manager 50 to switch the state of the control modules 154 to permit local control of the nodes 66*a* and/or 66*b* by the control modules 154, external control of the nodes 66*a* and/or 66*b* by the SDN configuration manager 50 and a hybrid including both local control of certain resources of the nodes 66*a* and/or 66*b* by the control modules 154 as well as external control of other resources of the nodes 66*a* and/or 66*b* by the SDN configuration manager 50. The OTSA 601*a* and 601*b* also serve to synchronize the local databases of network node configuration information utilized by the control modules 154 of the nodes 66*a* and 66*b* with the external database of network node configuration information accessed and maintained by the SDN configuration manager 50.

The OTSA 601*a* and/or 601*b* may also facilitate network discovery and network monitoring in the transport network 68 by the SDN configuration manager 50 by collecting information stored locally within the nodes 66*a* and 66*b* and transmitting such information to the SDN configuration manager 50. In addition, the OTSA 601*a* and/or 601*b* may also facilitate provisioning of paths within the transport network 68 by receiving and implementing instructions indicative of paths to be provisioned, activated or deactivated by the node 66*a* and/or 66*b*.

OTSA 601*a* and/or 601*b* present a simplified abstraction of one or more converged transport systems, suitable for integration into SDN frameworks. For example, the simplified abstraction may provide less than all of the information about the network. Rather, the simplified abstraction may represent the network elements and information required for a particular Network Service. OTSA 601*a* and/or 601*b* may be used to extend OpenFlow protocol for transport functions by receiving and executing instructions in the OpenFlow protocol on the nodes 66*a* and/or 66*b*. OTSA 601*a* and/or 601*b* may utilize other Web-based Application Program Interfaces (APIs), for example, REST when managing, configuring, discovering network topologies and monitoring the functions of the nodes 66*a* and 66*b*.

Utilization of OTSA 601 and the SDN configuration manager 50 provides flexible deployment scenarios. For example, the OTSA 601 and the SDN configuration manager 50 may be run natively on programmable packet/optical transport platforms and/or on one or more separate servers and/or in the internet "cloud". The OTSA 601 and the SDN configuration manager 50 can be run from anywhere, in or out of the network, in a singular or distributed fashion, and still provide connectivity to customers to the network as a whole and/or to particular Network Services.

Additionally, utilization of OTSA 601 supports multiple provisioning modes. For example, OTSA 601 may establish local control of the node by the control modules 154 in the nodes (referred to as "implicit" provisioning), or can in effect disable the local control functionality of the control modules 154 in the nodes to establish control of the nodes by the SDN configuration manager 50 (referred to as "explicit" provisioning) or can establish a hybrid between implicit and explicit provisioning. The OTSA 601 may utilize standard GMPLS protocols, as are well known in the art.

FIG. 10A is a block diagram of an exemplary explicit provisioning model in accordance with the present disclosure. In the explicit provisioning model, SDN configuration manager 50 may establish control of the nodes 66, creating centralization of network control. OTSA 601 may run on the nodes 66. The SDN configuration manager 50 may orchestrate multiple networks/layer that may run any and/or different protocols, such as MPLS, OTN or Ethernet for example.

FIG. 10B is a block diagram of an exemplary implicit provisioning model in accordance with the present disclosure. In the implicit provisioning model, OTSA 601 may establish local control of the node 66 by the control modules 154 in the nodes 66. SDN configuration manager 50 may create network abstractions per domain and multi-domain orchestration, leveraging existing nodal control plane. SDN configuration manager 50 may orchestrate multiple networks/layer that may run any and/or different protocols, such as MPLS, OTN or Ethernet for example.

Figure 11:
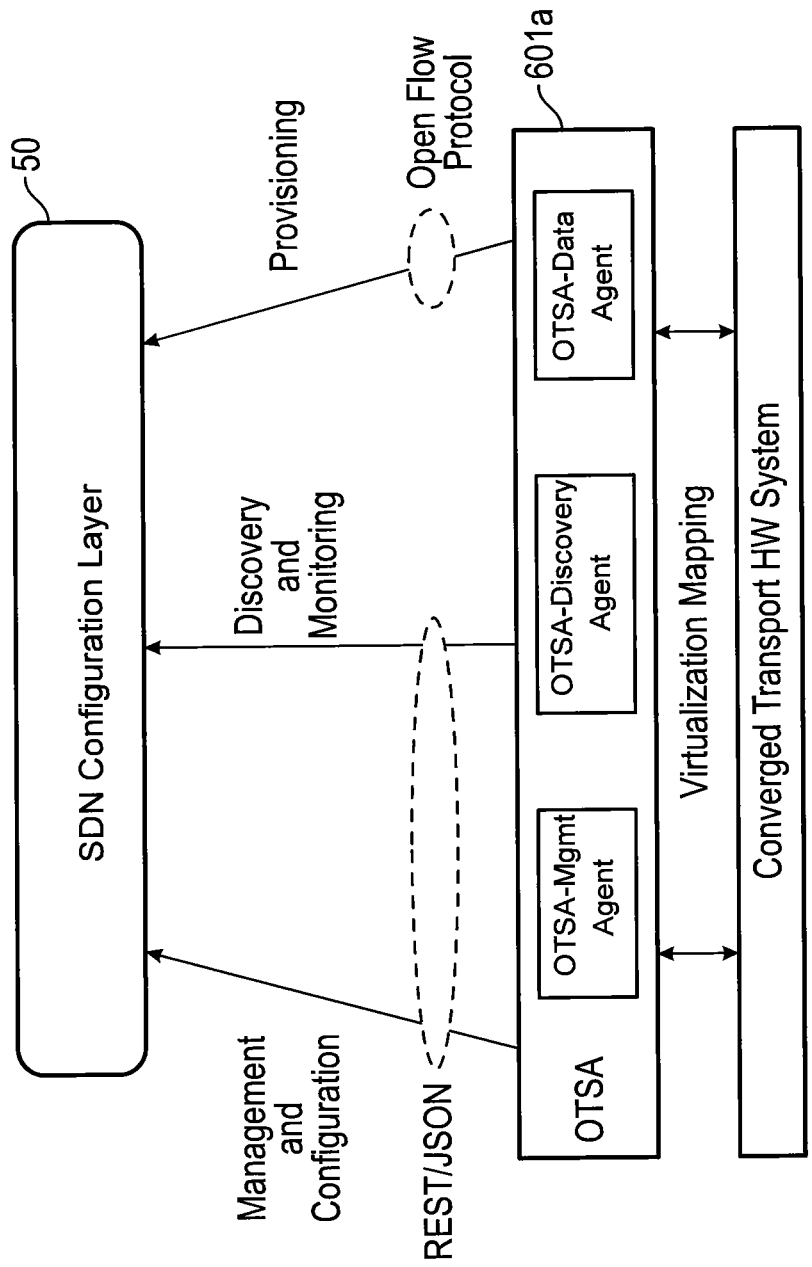
FIG. 11 is a block diagram of an exemplary implementation of the SDN configuration manager in accordance with the present disclosure.

FIG. 11 is a block diagram of an exemplary implementation of an Open Transport Switch (OTSA) 601*a* in accordance with the present disclosure communicating with the SDN configuration manager 50. The OTSA 601*a* may perform multiple functions, which may be divided into three functional pieces for the sake of explanation: an OTSA Management and Configuration Agent, an OTSA Discovery and Monitoring Agent, and a Provisioning Agent. The SDN configuration manager 50 may utilize OpenFlow protocol with the OTSA Data Agent for provisioning paths through the transport network 68. The SDN configuration manager 50 may utilize other protocols, such as REST/JSON API for configuration, management, discovery and monitoring with the OTSA Management and Configuration Agent and/or the OTSA Discovery and Monitoring Agent. The OTSA 601*a* may run on one or more network element and/or in the cloud. The OTSA 601*a* may create an abstraction of the network as a virtual network. In one example of virtualization mapping, the OTSA maps a converged transport system, such as a network containing and/or integrating together OTN, Ethernet, WDM, IP, Packet, and other sub-networks, to create a virtual network. The virtual network can be used as a simplified model that may interwork with, though does not require, GMPLS protocols. The virtual network is a logical model of network hardware and network layers.

Figure 12:
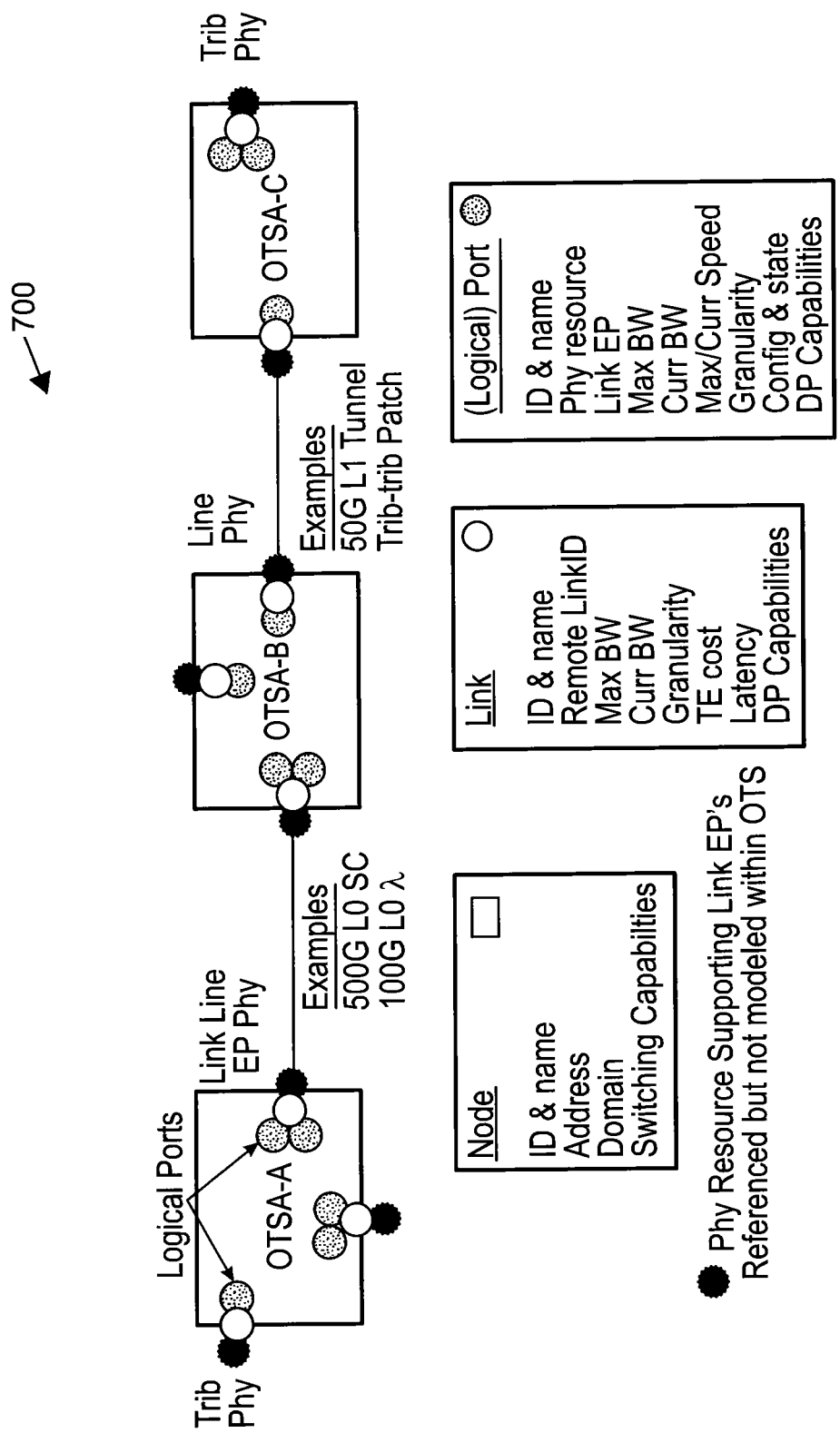
FIG. 12 is an example of logical network topology modeling in accordance with the present disclosure.

FIG. 12 is an example of logical network topology modeling in accordance with the present disclosure to provide a logical network 700 in which information indicative of managed entities having resources within the transport network 68 is converted into a common model and then made available in a format representative of a graphical illustration of the state of the resources allocated to customers on a customer-by-customer basis. The format representative of the graphical illustration can be implemented in a variety of manners. For example, the format can be hypertext markup language, tiff, or .pdf. The logical network 700 may model network information into first, second and third categories, such as Nodes, Links, and (Logical) Ports for use in the virtual network as well as whether such nodes, links and ports are under local control of the control modules 154 or under external control by the SDN configuration manager 50. The categories may be stored in one or more database. In one example of such categories, Nodes may include and/or be identified by ID and name, address, domain, and/or switching capabilities of network elements. Links may include and/or be identified by ID and name, remote LinkID, Maximum Bandwidth, Current Bandwidth, Granularity, TE cost, Latency, and/or DP capabilities of network links. (Logical) Ports may include and/or be identified by ID and name, Physical resource (that is, name of resource for which the data plane is being used), Link EP, Maximum Bandwidth, Current Bandwidth required, Maximum/Current Speed, Granularity, Configuration and state, and/or DP Capabilities of network ports. The virtual network may also reference information of physical resources supporting Link End Points.

OTSA 601 collection and utilization of such categories by the SDN configuration manager 50 creates a simplified view (referred to herein as a "virtual overlay") of the transport network 68 that can be provisioned, configured, managed and controlled. The information indicative of the nodes may be utilized to create a logical (virtual) transport system of the virtual overlay with switching capability and capacity. The information indicative of the links can be used as an abstract of inter-OTSA bandwidth and physical implementation of the virtual overlay. Links provide generalized topological bandwidth links that maps to a set of physical resources and may provide a tunnel to an adjacent node and/or to a trib. Links may be comprised of logical ports plus link attributes. The nodes need not be physically adjacent. The information indicative of the logical Ports may provide points for data plane connectivity of the virtual overlay. Logical Ports are logical ports for service connectivity that map to physical port resources. Not all physical ports are enabled to be controlled by the SDN configuration manager 50. Ports and Nodes that are not enabled to be controlled by the SDN configuration manager 50 may be excluded from the virtual network, if desired.

The virtual overlay of the transport network is used by the SDN configuration manager to create a Network SNC for each customer including indicia which can be displayed graphically to the customer via the user devices 14. Indicia may be used to communicate information to the customer. As discussed above, the computer system 10, including the SDN configuration manager 50 manages and interprets many different kinds of managed entities and merges them into a single Network SNC for the customer. Multiple Network SNCs can be created for each customer, or a single Network SNC can be created for each customer. In either instance, this greatly simplifies the management of the managed entities for the customer because the virtual overlay provides a graphical illustration of the state of the resources within the transport network 68 that are allocated to the customer. The Network SNC for each customer may include indicia indicative of whether the nodes, links and ports are under local control of the control modules 154 or under external control by the SDN configuration manager 50.

FIGS. 13A, 13B, and 13C are diagrams of exemplary implementations of the SDN configuration manager 50 and the OTSA 601. In FIG. 13A, the OTSA 601 and the SDN configuration manager 50 are both implemented within the node 66b that can be used to provision, configure, manage and control other nodes, such as the node 66a having the OTSA 601 within the transport network 68. The OTSA 601 may be run by one or more processor within the node 66b, such as within the control module 154. A sub-set of nodes 66 may run the OTSA 601 instances. OTSA 601b may utilize OpenFlow in communication with the SDN configuration manager 50. The node 66 may contain an Operating System 603, for example, IQ Network Operating System (IQNoS).

In FIG. 13B, the SDN configuration manager 50 is implemented within one or more server, for example, in the servers 18 of the host system 12 (which may be the Service Provider Network Operations Center). The OTSA 601 may run within a server running the SDN configuration manager 50 or run separately from the SDN configuration manager 50. OTSA 601 may run on node 66.

In FIG. 13C, the SDN configuration manager 50 is implemented within the cloud and OTSA 601 may run on node 66. The SDN configuration manager 50 may also handle multi-vendor adaptors for different vendor specific APIs for communicating with the nodes 66a-66n. Alternatively, the SDN configuration manager 50 may utilize a common protocol for communicating with the OTSA 601 installed on each node 66a-66n, which may utilize vendor specific APIs for provisioning, configuring, managing and/or controlling the nodes 66a-66n.

Figure 14:
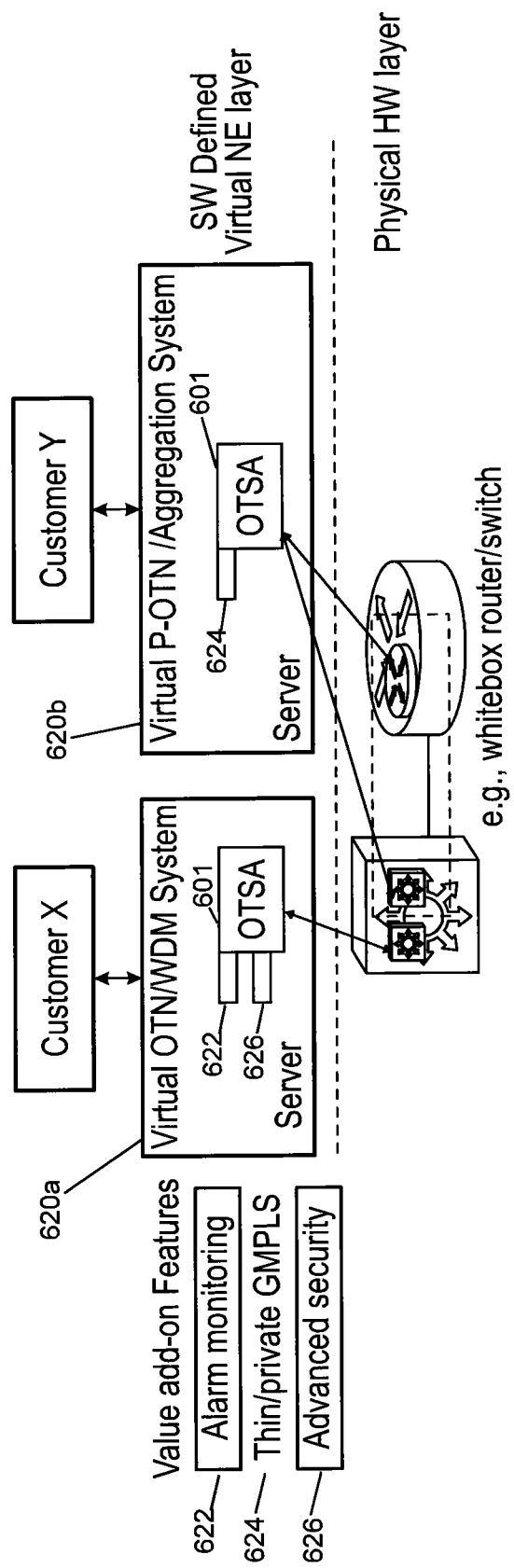
FIG. 14 is a diagram of an exemplary implementation of the SDN configuration manager managing parts of the transport network for multiple customers and providing different services for the customers in accordance with the present disclosure.

FIG. 14 is a diagram of an exemplary implementation of virtual networking in accordance with the present disclosure. As previously described, services objects can be created for each customer. In one implementation, the virtual overlay provides a graphical illustration of the state of the resources within the transport network 68 that are allocated to the customer. For example, customer X may be presented with a virtual network 620a comprising a virtual OTN/WDM system on a first server. Customer Y may be presented with a virtual network 620b comprising a virtual P-OTN/Aggregation system on a second server. The customer view of the network may be limited to a software defined virtual network element layer. Under the virtual network layer is the physical hardware layer. Additionally, particular customers may be provided with individualized value add-on features, for example, alarm monitoring 622, thin/private GMPLS 624, and/or advanced security 626. Particular customer's virtual networks can be customized for the customer. For example, customer X may be provided with alarm monitoring 622 and advanced security 626, while customer Y may be provided with thin/private GMPLS 624. In this way, multiple customers can login simultaneously and manage different parts of the overall network that are under the control of the SDN configuration manager 50. The SDN configuration manager 50 can also be used to create virtual models of third party systems, for example, high-density, low-cost packet aggregation systems for metro applications. The SDN configuration manager 50 may present the virtualized view to customers as an integrated solution.

The server based feature platform of the OTSA may be independent of embedded network element control/management planes. The OTSA software is decoupled from the network element software, such that the OTSA software may be upgraded without coordination with network element software releases.

Figure 15A:
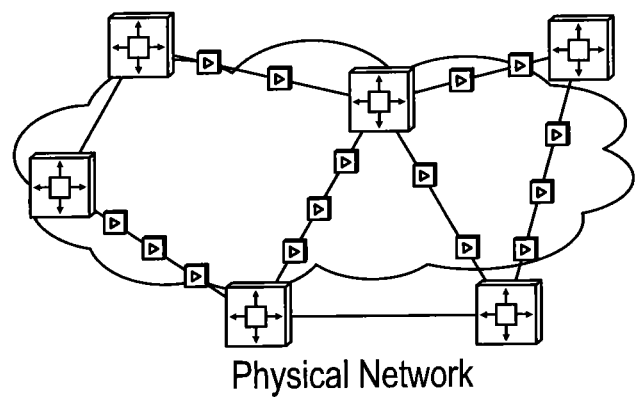
FIG. 15A is a diagram of an exemplary physical network in accordance with the present disclosure.
Figure 15B:
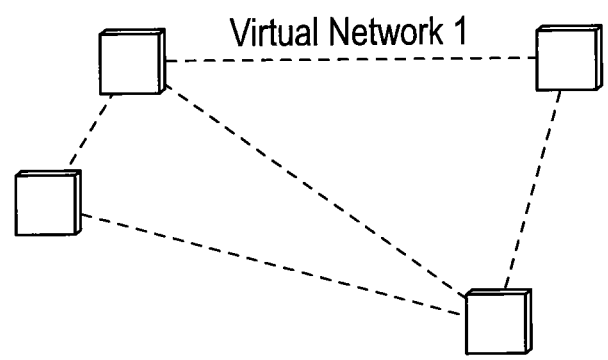
FIG. 15B is a diagram of an exemplary virtual network for a first customer in accordance with the present disclosure.
Figure 15C:
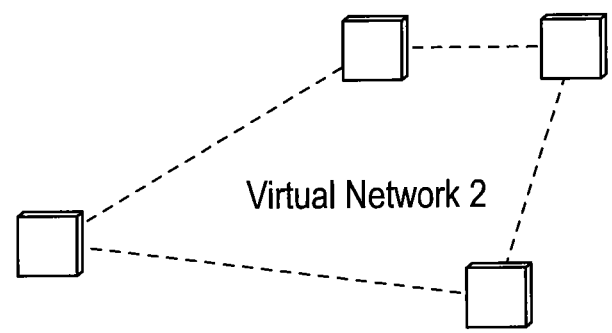
FIG. 15C is a diagram of another exemplary virtual network for a second customer in accordance with the present disclosure.

FIGS. 15A, 15B, and 15C are diagrams of exemplary networks in accordance with the present disclosure. FIG. 15A represents a physical network having multiple network elements, ports and links. The SDN configuration manager 50 creates an abstract of the physical network with Nodes, Ports, and Links as discussed above. The virtual network may be customized for customers to show the state of the resources within the transport network 68 that are allocated to the customer. For example, FIG. 15B is a diagram of a first virtual network for a first customer showing only the abstracted view of the network resources within the transport network 68 that are allocated to the first customer. Likewise, FIG. 15C is a diagram of a second virtual network for a second customer showing only the abstracted view of the network resources within the transport network 68 that are allocated to the second customer.

Figure 16:
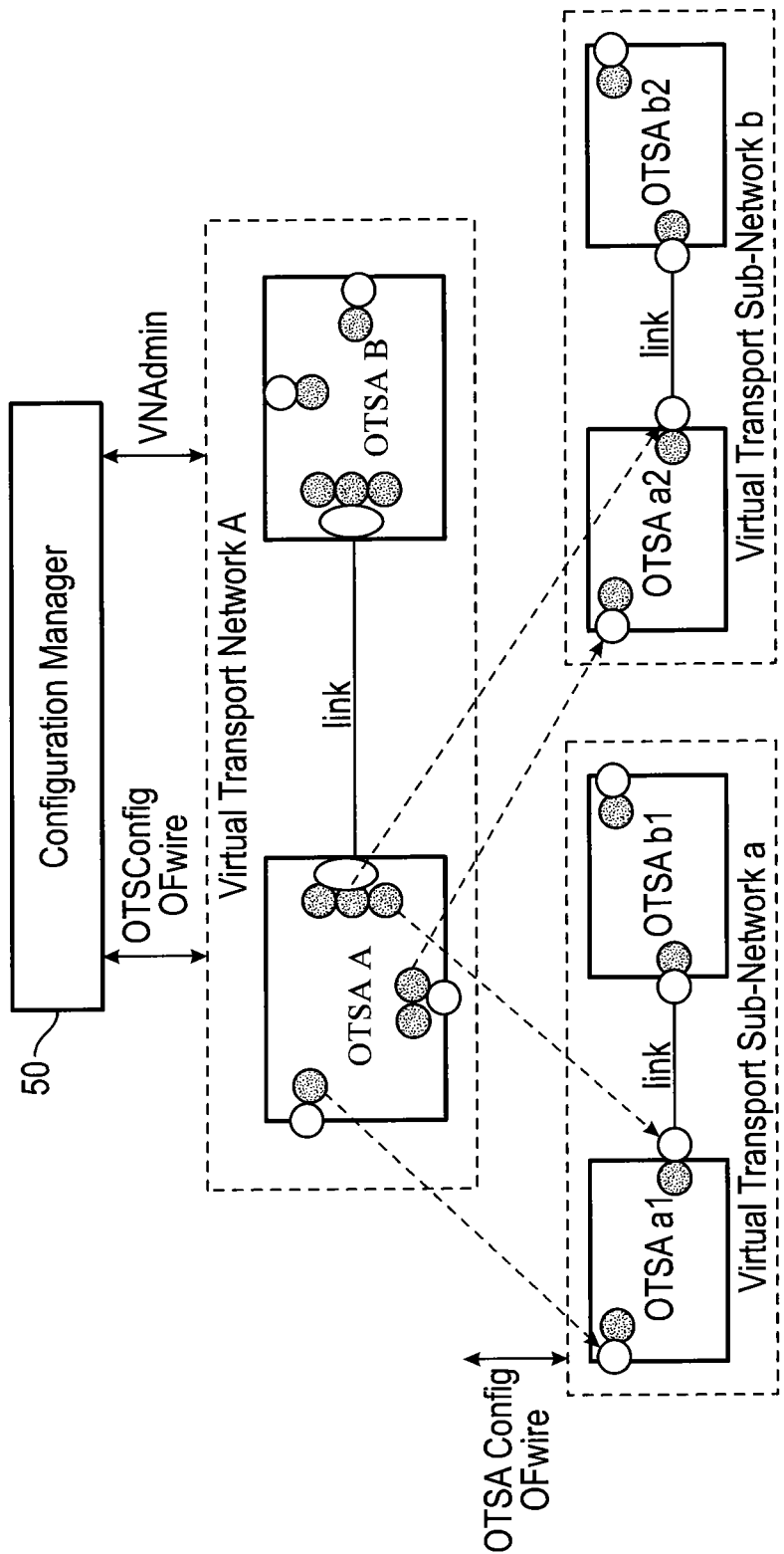
FIG. 16 is a diagram of an implementation of hierarchal virtual networks.

FIG. 16 is a diagram of an implementation of the SDN configuration manager 50 modeling a hierarchal physical network into hierarchal virtual networks. The SDN configuration manager 50 may abstract the transport network 68 into a hierarchy of sub-networks. A Virtual Network Administrator (VNA) may enable creation of virtual networks within virtual networks. Internal administrative partitioning of the virtual network may also be used. Logical Ports from a parent VPN may be partitioned and assigned as link resources in one or more child VPN. For example, Virtual Transport Network A may be the parent virtual network, for example, having multiple Nodes, Links, and Ports. Virtual Transport Network A may be further partitioned by the VNA into Virtual Transport Sub-Network A and Virtual Transport Sub-Network B, each Sub-Network also having Nodes, Links, and Ports. The physical elements of the Virtual Transport Network and Sub-Networks may communicate with the SDN configuration manager 50 and may support multiple protocols such that multiple applications may be built on top of the physical elements and modeled within the virtual networks.

Figure 17:
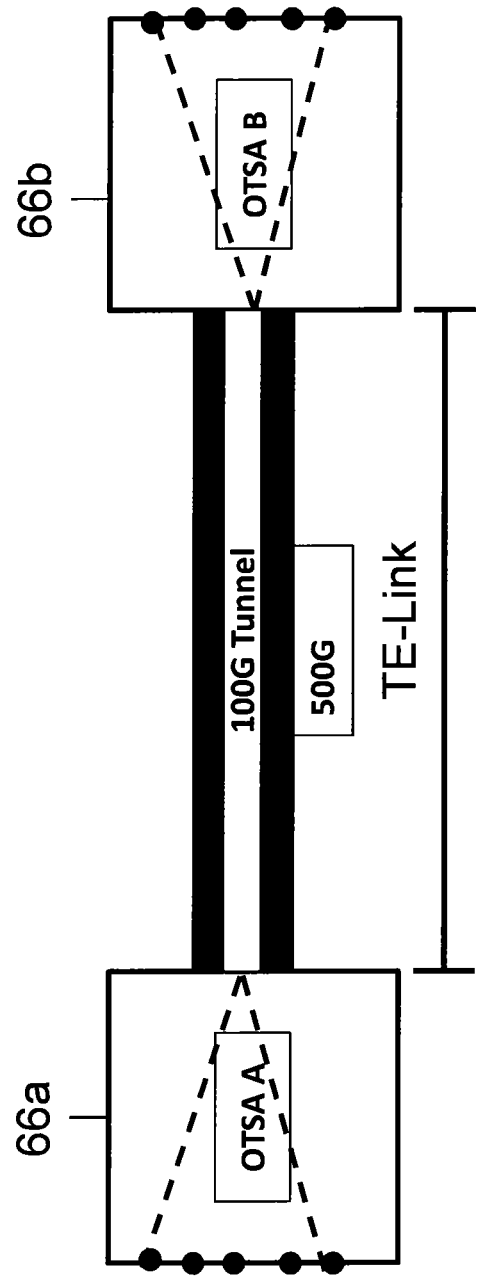
FIG. 17 is a diagram of an exemplary tunnel between nodes in accordance with the present disclosure.

FIG. 17 is a diagram of an exemplary tunnel between nodes within the transport network. A link (also referred to as a tunnel) may be created within the overall bandwidth between nodes within the transport network 68. In this example, the nodes 66a and 66b, for example, may be physically adjacent to each other. Tributary ports can be cross-connected into this tunnel for customer traffic, while the remaining bandwidth can be used for regular traffic. GMPLS protocols may be utilized in provisioning the tunnel. For example, physical nodes 66a and 66b may have a 500 G OCG in a TE-link between the nodes 66a and 66b. The SDN configuration manager 50 may abstract the link and provide to a customer a view of the resources allocated to the customer, for example, a 100 G tunnel between node 66a and node 66b, while the remaining 400 G may be used for other data traffic. This model allows for bandwidth adjustment on demand. For example, if a customer requests additional bandwidth, the bandwidth resources may be allocated quickly by the OTSA 601a and 601b (running on the nodes 66a and 66b) with instructions from the SDN configuration manager 50 as the SDN configuration manager 50 has overall information as to what bandwidth is available for allocation.

Figure 18:
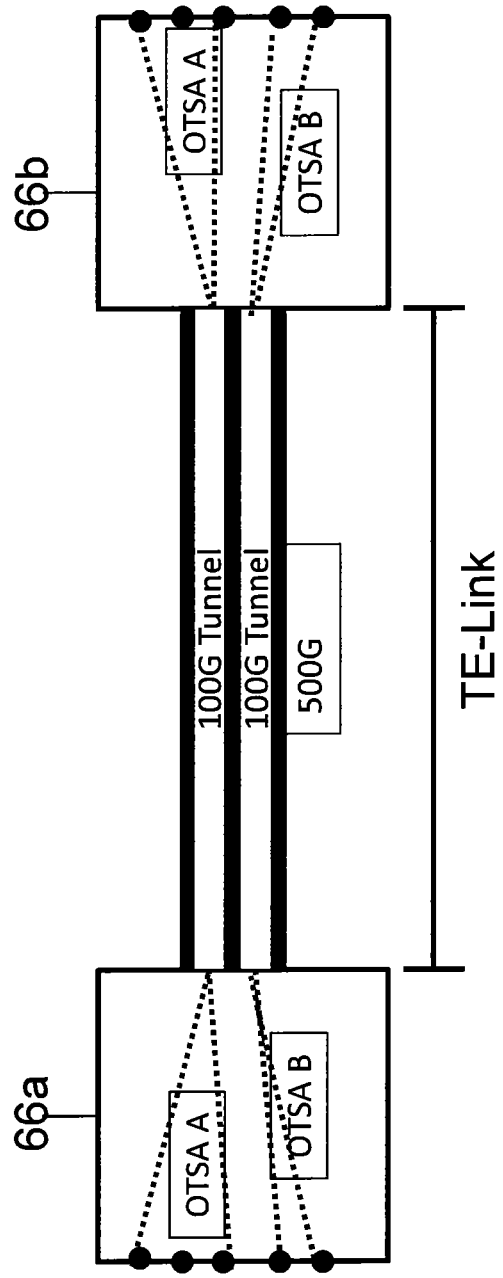
FIG. 18 is a diagram of another exemplary implementation of interfaces of nodes being used to set up two different tunnels in accordance with the present disclosure.

FIG. 18 is a diagram of another exemplary implementation of the nodes 66a and 66b communicating with each other. The SDN configuration manager 50 may be used to share multiple ports or other resources within the nodes 66a and 66b (shown as OTSA A and OTSA B on the nodes 66a and 66b) to set up multiple tunnels between optically-adjacent ports (or other resources) under control of the SDN configuration manager 50 (referred to as multi-tenancy). There may be individual line-to-line SNCs between the respective OTSA A and OTSA B instances on the nodes 66a and 66b. For example, with a 500 G OCG between Node 66a and node 66b, trib ports controlled by OTSA A may map to a 100 G tunnel owned by OTSA A on Node 66a, while trib ports controlled by OTSA B may map to a 100 G tunnel owned by OTSA B on Node 66a. The remaining 300 G may be used for regular data traffic.

Figure 19:
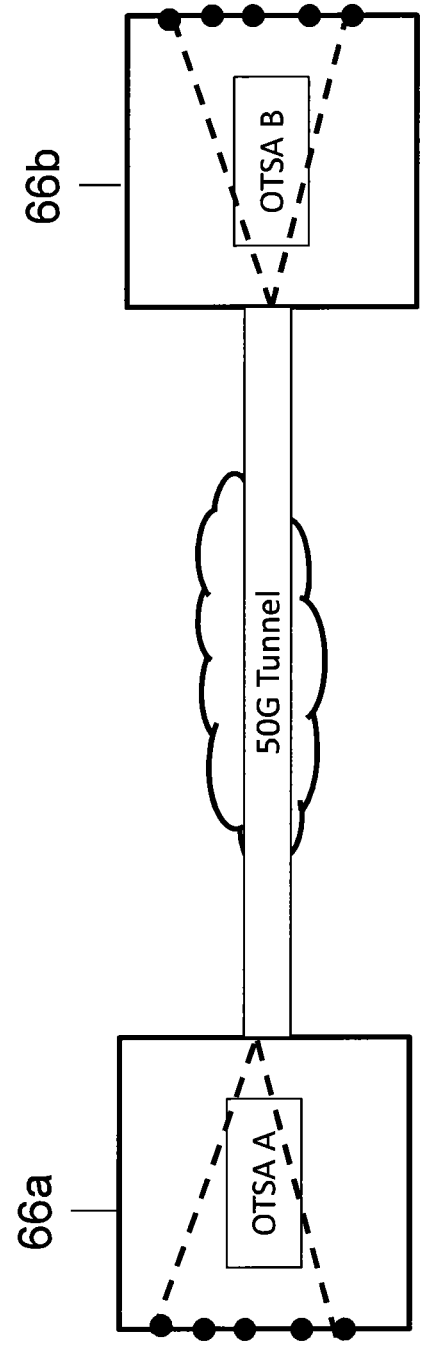
FIG. 19 is a diagram of another exemplary implementation of interfaces of nodes being used to set up a tunnel in accordance with the present disclosure.

FIG. 19 is a diagram of another exemplary implementation of the nodes 66a and 66b communicating with each other. GMPLS may be used for creating tunnels between non-adjacent OTSA instances, for example, through an intermediate network. In this example, two nodes, nodes 66a and 66b are running OTSA instances, OTSA A and OTSA B. The nodes 66a and 66b are separated by an intermediate network that is not under control of the SDN configuration manager 50, but is interconnected by wave service. The GMPLS protocol may be used between nodes 66a and 66b to dynamically create a tunnel or path between the OTSA A and OTSA B by the OTSA A and/or OTSA B utilizing suitable protocols, such as RSVP-TE, to setup the path through the intermediate network. For example, there may be 100 G of capacity through the intermediate network between node 66a and node 66b. A logical path (or tunnel) of 50 G is computed by the SDN configuration manager 50 and instructions are sent to the OTSA A and/or the OTSA B running on the nodes 66a and 66b. The SDN configuration manager 50 knows the network topology between OTSA A and OTSA B to create the path or tunnel through the intermediate network between node 66a and node 66b.

Figure 20:
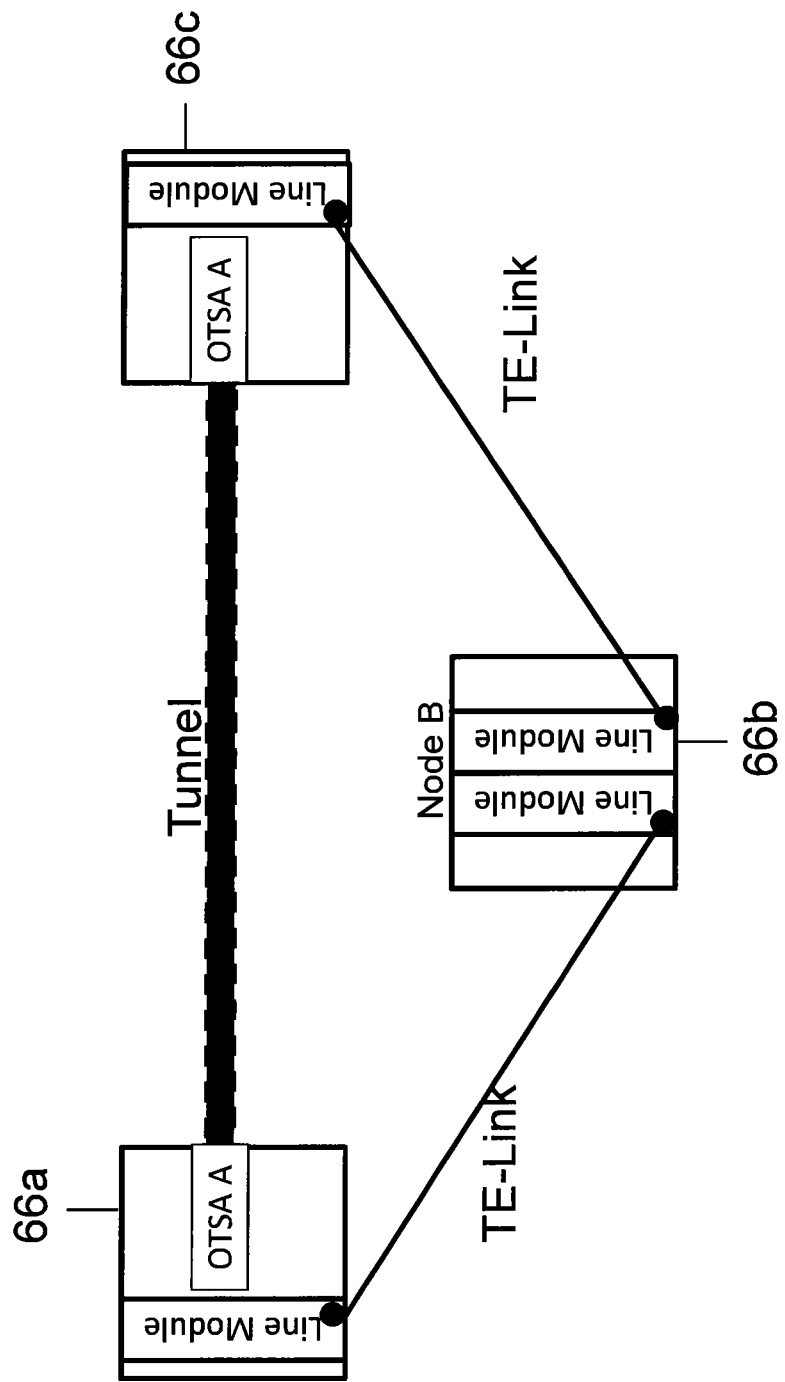
FIG. 20 is a diagram of another exemplary implementation of a portion of the transport network in which two nodes communicate via TE Links through an intermediate node, but are modeled in a virtual network as communicating directly in accordance with the present disclosure.

Similarly, as shown in FIG. 20, GMPLS may be utilized for creating a tunnel between non-adjacent OTSA instances within a GMPLS domain. For explanatory purposes, the GMPLS domain in FIG. 20 comprises Nodes 66a, 66b, and 66c, with respective OTSA instances OTSA A, OTSA B, and OTSA C. Nodes 66a, 66b, 66c may contain one or more OTN line modules. In the case of a L1 tunnel (digital express), an OTSA level logical tunnel may be created between node 66a and node 66c, for example. Physical/OCG connectivity is via an intermediate digital site node 66b, where a line-to-line cross connection is implemented. However, the abstracted virtual network provided to the customer may simply show node 66a and node 66c and a tunnel between node 66a and node 66c.

Figure 21:
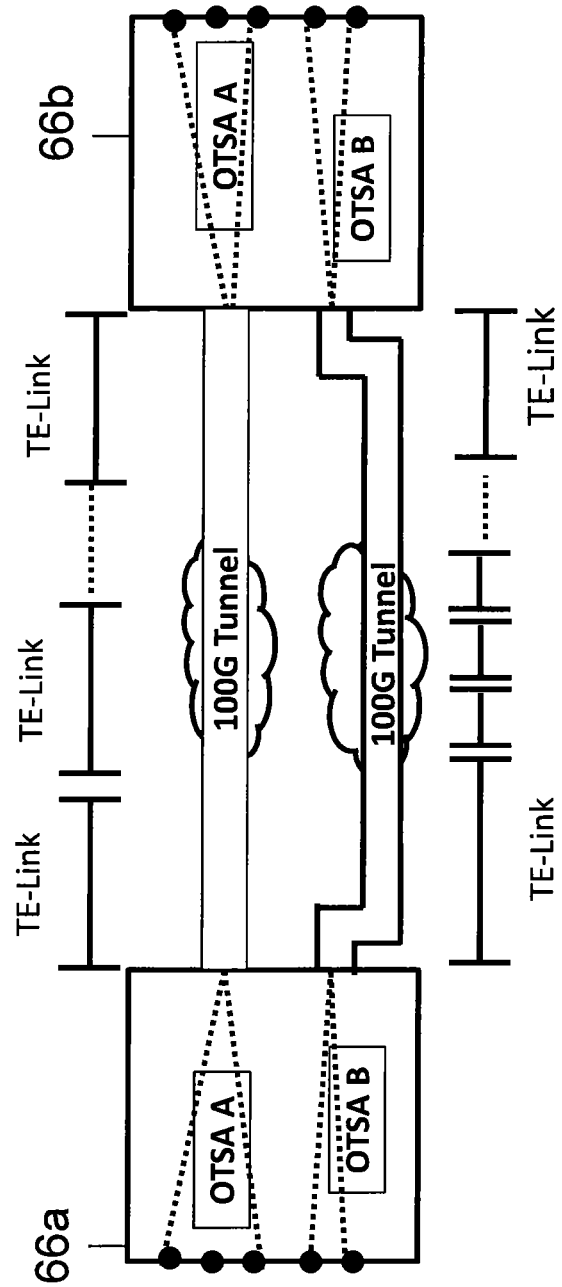
FIG. 21 is a diagram of another exemplary implementation of two nodes communicating by way of two separate tunnels in accordance with the present disclosure.

FIG. 21 is a diagram of another exemplary implementation of the node 66a communicating with the node 66b through multiple traffic engineering links. In this example, GMPLS is utilized for creating multiple tunnels between non-adjacent OTSA instances within a GMPLS domain with multi-tenancy. For example, node 66a and node 66b may each have multiple OTSA instances, such as OTSA A and OTSA B, sharing line side resources. Here the nodes 66a and 66b are logical (Layer L1) neighbors, that are not physically connected via OCG. There are individual line-to-line SNCs between the OTSA A and OTSA B on node 66a and node 77b. Trib ports controlled by OTSA A map to a first 100 G tunnel controlled by OTSA A on node 66a. Trib ports controlled by OTSA B map to a second 100 G tunnel controlled by OTSA B on node 66a. The L1 tunnels might be traversing over multiple TE-Lines/hops between node 66a and node 66b. For example, in FIG. 21, the first and second tunnels have a different number of hops/TE-links.

Of course, it will be understood that the implementations of the SDN configuration manager 50 and the OTSA running on two or more of the nodes 66a-66n that are described herein are merely for explanatory purposes and that other variations may be implemented for transport networks.

CONCLUSION

Conventionally, in a classical router or switch, the fast packet forwarding (data path) and the high level routing decisions (control path) occur on the same device. An OpenFlow Switch separated these two functions. The data path portion of the OpenFlow switch still resides on the switch, while high-level routing decisions were moved to a separate controller, typically a standard server. Additionally, in current systems, sub-networks in an overall network are handled by separate departments/network operations, causing delays and increase operational costs for creating end to end service orders.

In accordance with the present disclosure, methods, nodes, and systems are described which enhance the management and provisioning of transport networks which may conform to the GMPLS protocols, for example. In one embodiment, instead of segmented networks, a virtual overlay network is created, comprising of network elements from the three segments. The end-to-end SNC can then be created on top of the virtual overlay network. In some embodiments, the transport network is provided with a plurality of nodes with at least some of the nodes having a control module having a first processor accessing a first database storing first network node configuration information and being configured to compute a first path to a destination node within the transport network through the output interface with the first network node configuration information. Once the first path is computed, then the first processor sends first signals, which can conform to RSVP or RSVP-TE signaling protocols to other nodes on the first path so that the other nodes will be configured to be a part of the first path. The first processor can be a component of a headend node of the first path.

The transport network is also provided with a SDN configuration manager that may be separate from the plurality of nodes and which can disable at least a portion of the functionality of the control modules of particular nodes within the transport network to allow a second processor accessing a second database storing second network node configuration information to compute a second path from a headend node (that does not include the second processor) to a tailend node of the plurality of nodes, updating the second network configuration information with information indicative of the second path, and sending second signals to the switches of the headend node and the tailend node to set up and enable the second path. The second signals may conform to the protocol of the first signals, or may utilize a different protocol such as a protocol referred to in the art as "OpenFlow."

Utilizing a hybrid approach with first and second processors with the first processor being a part of the headend node of the paths computed by the first processor within the transport network, and the second processor being separate from the headend node of at least some of the paths computed by the second processor within the transport network provides additional flexibility in the management, configuration, discovery, monitoring and provisioning of the transport network.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328, "OSPF Version 2," Moy, J., The Internet Society, April 1998.

RFC 3209, "RSVP-TE: Extensions to RSVP for LSP Tunnels", The Internet Society, Awduche et al., December 2001.

RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC 3945, Mannie, E., "Generalized Multi-Protocol Label Switching (GMPLS) Architecture", October 2004.

RFC 4379, "Detecting Multi-Protocol Label Switched (MPLS) Data Plane Failures," Kombella, K. and Swallow, G., The Internet Society, February 2006.

RFC 4872, "RSVP-TE Extensions for E2E GMPLS Recovery," J. P. Lang, Y. Rekhter, D. Papadimitriou, The Internet Society, May 2007.

RFC 4873, "GMPLS Segment Recovery," L. Berger et al, The Internet Society, May 2007.

G.709-v3 ITU-T, "Interfaces for the Optical Transport Network (OTN)", G.709 Recommendation, December 2009.

G.872 ITU-T, "Architecture of optical transport networks", November 2001.

What is claimed is:

1. A node, comprising:
   an input interface for receiving traffic from a first communication link;
   an output interface for transmitting traffic to a second communication link;
   a switch for communicating the traffic from the input interface to the output interface; and a control module located proximate to the input interface, output interface and the switch, the control module comprising a communication interface configured to connect to a third communication link external to the node, the control module having a processor accessing network node configuration information and being configured to compute a path to a destination node through the output interface with the network node configuration information and also configured to be switched from a first state in which the processor provides first instructions to the switch to configure the switch to communicate the traffic from the input interface to the output interface, to a second state in which the processor provides second instructions, received via the communication interface, to the switch to configure the switch to communicate traffic from the input interface to the output interface.

2. The node of claim 1, wherein the input interface is a first input interface and the output interface is a first output interface, and further comprising a second input interface for receiving traffic from a fourth communication link and a second output interface for transmitting traffic to a fifth communication link; and wherein the processor is configured to be switched to a third state in which the processor provides the first instructions to the switch to configure the switch to communicate the traffic from the first input interface to the first output interface, and provides third instructions, received via the communication interface, to the switch to configure the switch to communicate traffic from the second input interface to the second output interface.

3. The node of claim 1, wherein the processor utilizes GMPLS protocols to compute the path to the destination node.

4. The node of claim 1, wherein the second instructions are generated utilizing GMPLS protocols.

5. The node of claim 1, wherein, in the first state, the processor generates and transmits signals to at least the destination node via the communication interface to set up the path to the destination node.

6. The node of claim 1, wherein the input interface has first resources and second resources that are allocable to receiving traffic from the first communication link, and wherein the processor is configured with a third state in which the processor provides third instructions to the switch to configure the switch to allocate at least a portion of the first resources to communicate the traffic from the input interface to the output interface, and provides fourth instructions, received via the communication interface, to the switch to allocate at least a portion of the second resources to communicate traffic from the input interface to the output interface.

7. A network, comprising:
a plurality of communication links;
a first node and a second node, the first node having a control module with a first processor computing a first path to the second node through at least a first one of the plurality of communication links, storing first network configuration information indicative of the first path, and sending a first signal to the second node to enable the second node to form a part of the first path;
a third node and a fourth node, the third node coupled with the fourth node, via at least a second one of the plurality of communication links; and
a SDN configuration manager that is separate from the third node and the fourth node, the SDN configuration manager having a second processor computing a second path from the third node to the fourth node through at least the second one of the plurality of communication links, storing second network configuration information indicative of the second path, and sending second signals to the third node and the fourth node to enable the third node to be a headend node of the second path, and the fourth node to be a tailend node of the second path.

8. The network of claim 7, wherein the headend node is a first headend node, and the tailend node is a first tailend node, and wherein the first node is coupled with the third node, via at least a third one of the plurality of communication links, and wherein the second processor of the SDN configuration manager computes a third path from the first node to the third node through at least the third one of the plurality of communication links, stores third network configuration information indicative of the third path, and sends third signals to the first node and the third node to enable the first node to be a second headend node of the third path, and the third node to be a second tailend node of the third path.

9. The network of claim 7, wherein the first processor utilizes GMPLS protocols to compute the first path to the second node.

10. The network of claim 7, wherein the second processor utilizes GMPS protocols to compute the second path from the third node to the fourth node, and to generate the second signals that enable the third node to be the headend node of the second path, and the fourth node to be the tailend node of the second path.

11. A network control apparatus, comprising:
a node, comprising:
a first input interface;
a second input interface;
a first output interface;
a second output interface;
a switch for communicating traffic from the first and second input interfaces to the first and second output interfaces; and
a control module located proximate to the first and second input interfaces, the first and second output interfaces and the switch, the control module having first configuration information to enable a first processor of the control module to configure the switch to direct traffic from the first input interface to the first output interface; and
a SDN configuration manager that is separate from the control module, the SDN configuration manager having second configuration information to enable a second processor of the control module to configure the switch to direct traffic from the second input interface to the second output interface.

12. A node, comprising:
an input interface for receiving traffic from a first communication link, the input interface having first resources and second resources that are allocable to receiving traffic from the first communication link;
an output interface for transmitting traffic to a second communication link;
a switch for communicating the traffic from the input interface to the output interface; and
a control module located proximate to the input interface, output interface and the switch, the control module comprising a communication interface configured to connect to a third communication link external to the node, the control module having a processor accessing network node configuration information and being configured to compute a path to a destination node through the output interface with the network node configuration information and also configured with a state in which the processor provides first instructions to the switch to configure the switch to allocate at least a portion of the first resources to communicate the traffic from the input interface to the output interface, and provides second instructions, received via the communication interface, to the switch to allocate at least a portion of the second resources to communicate traffic from the input interface to the output interface.

* * * * *